US010169802B2

(12) United States Patent
Kalikivayi et al.

(10) Patent No.: US 10,169,802 B2
(45) Date of Patent: Jan. 1, 2019

(54) DATA REFINING ENGINE FOR HIGH PERFORMANCE ANALYSIS SYSTEM AND METHOD

(71) Applicant: Indix Corporation, Seattle, WA (US)

(72) Inventors: Satyanarayana Rao Kalikivayi, Chennai (IN); Mohammed J. Zahoor, Chennai (IN); Sanjay Parthasarathy, Bellevue, WA (US)

(73) Assignee: Indix Corporation, Seattle, WA (US)

( * ) Notice: Subject to any disclaimer, the term of this patent is extended or adjusted under 35 U.S.C. 154(b) by 502 days.

(21) Appl. No.: 14/935,332

(22) Filed: Nov. 6, 2015

(65) Prior Publication Data

US 2016/0063594 A1    Mar. 3, 2016

Related U.S. Application Data

(63) Continuation-in-part of application No. 14/726,707, filed on Jun. 1, 2015, now Pat. No. 9,466,066, and a continuation-in-part of application No. 13/951,248, filed on Jul. 25, 2013, which is a continuation of application No. 13/951,244, filed on Jul. 25, 2013, now Pat. No. 9,047,614.

(Continued)

(51) Int. Cl.
*G06F 17/30* (2006.01)
*G06Q 30/06* (2012.01)
*G06F 17/27* (2006.01)
*G06Q 30/02* (2012.01)
*G06F 7/00* (2006.01)

(52) U.S. Cl.
CPC ..... *G06Q 30/0629* (2013.01); *G06F 17/2705* (2013.01); *G06F 17/30864* (2013.01); *G06Q 30/0201* (2013.01); *G06Q 30/0627* (2013.01)

(58) Field of Classification Search
CPC .......... G06Q 30/0629; G06Q 30/0201; G06Q 30/0627; G06F 17/2705; G06F 17/30864
USPC ........................................................ 707/716
See application file for complete search history.

(56) References Cited

U.S. PATENT DOCUMENTS 6,029,139 A * 2/2000 Cunningham ......... G06Q 10/06
                                                    705/14.43
6,078,892 A * 6/2000 Anderson .............. G06Q 30/02
                                                    705/14.64

(Continued)

FOREIGN PATENT DOCUMENTS

KR    10-2010-0037401 A    4/2010
WO    2001050320 A1    7/2001

(Continued)

OTHER PUBLICATIONS

International Search Report and Written Opinion issued in related International Application No. PCT/US2013/052106, dated Jul. 25, 2013, 15 pages.

*Primary Examiner* — Pavan Mamillapalli
(74) *Attorney, Agent, or Firm* — Schwabe, Williamson & Wyatt, P.C.

(57) ABSTRACT

Price and product attributes from webpages are imported, indexed, analyzed, and made available to be searched in close-to realtime, allowing search for price changes specific to products on individual webpages and for products across all webpages as well as to identify longitudinal correlations between price changes and product attributes. Users may search the data and set alerts.

23 Claims, 23 Drawing Sheets

Related U.S. Application Data

(60) Provisional application No. 61/675,492, filed on Jul. 25, 2012.

(56) References Cited

U.S. PATENT DOCUMENTS

| | | | | |
|---|---|---|---|---|
| 6,377,963 | B1 * | 4/2002 | Walker | G06F 17/30864 |
| | | | | 707/999.003 |
| 6,381,597 | B1 | 4/2002 | Lin | |
| 6,473,898 | B1 * | 10/2002 | Waugh | G06F 17/30286 |
| | | | | 707/999.104 |
| 6,675,354 | B1 * | 1/2004 | Claussen | G06F 17/2247 |
| | | | | 715/205 |
| 6,850,900 | B1 * | 2/2005 | Hare | G06Q 30/0625 |
| | | | | 705/26.62 |
| 7,711,775 | B2 | 5/2010 | Tavis et al. | |
| 9,047,614 | B2 | 6/2015 | Kalikivayi et al. | |
| 9,652,538 | B2 * | 5/2017 | Shivaswamy | G06F 17/30864 |
| 9,898,767 | B2 * | 2/2018 | Psota | G06Q 30/0605 |
| 2001/0047404 | A1 | 11/2001 | Takashi | |
| 2004/0168124 | A1 | 8/2004 | Beisiegel et al. | |
| 2005/0004889 | A1 | 1/2005 | Bailey | |
| 2006/0075500 | A1 | 4/2006 | Bertman et al. | |
| 2006/0129463 | A1 * | 6/2006 | Zicherman | G06Q 30/02 |
| | | | | 705/14.73 |
| 2007/0043723 | A1 | 2/2007 | Bitman et al. | |
| 2007/0045393 | A1 | 3/2007 | Hartenstine | |
| 2007/0276816 | A1 | 11/2007 | Sample et al. | |
| 2011/0078487 | A1 | 3/2011 | Nielsen | |
| 2014/0032263 | A1 | 1/2014 | Kalikivayi et al. | |

FOREIGN PATENT DOCUMENTS

| | | |
|---|---|---|
| WO | 2002010961 A2 | 2/2002 |
| WO | 2002-035421 A1 | 5/2002 |
| WO | 2005-036306 A2 | 4/2005 |

* cited by examiner

DATA REFINING ENGINE FOR HIGH PERFORMANCE ANALYSIS SYSTEM AND METHOD

CROSS-REFERENCE TO AND INCORPORATION BY REFERENCE OF RELATED APPLICATIONS

This application is a continuation-in-part of, claims the benefit of and incorporates by reference U.S. patent application Ser. No. 13/951,248, filed on Jul. 25, 2013, entitled, "Data Refining Engine for High Performance Analysis System and Method, which application claims the benefit of and incorporates by reference U.S. Provisional Patent Application No. 61/675,492, filed on Jul. 25, 2012. This application is also a continuation-in-part of and also claims the benefit of and incorporates by reference U.S. patent application Ser. No. 14/726,707, filed on Jun. 1, 2015, entitled, "Adaptive Gathering of Structured and Unstructured Data System and Method," which application is a continuation of issued U.S. patent application Ser. No. 13/951,244, filed on Jul. 25, 2013, now issued as U.S. Pat. No. 9,047,614, and entitled, "Adaptive Gathering of Structured and Unstructured Data System and Method." The entire disclosures of the foregoing applications are incorporated in their entireties for all purposes by this reference.

FIELD

This disclosure relates to a method and system to analyze price and product information.

BACKGROUND

The following description includes information that may be useful in understanding the present invention. It is not an admission that any of the information provided herein is prior art or relevant to the presently claimed invention, or that any publication specifically or implicitly referenced is prior art.

Search engines, such as Google, Bing, and others search and index vast quantities of information on the Internet. "Crawlers" (a.k.a. "spiders") utilize URIs obtained from a "queue" to obtain content, usually from web pages. The crawlers or other software store and index some of the content. Users can then search the indexed content, view results, and follow hyperlinks back to the original source or to the stored content (the stored content often being referred to as a "cache"). Computing resources to crawl and index, however, are not limitless. The URI queues are commonly prioritized to direct crawler resources to web page servers which can accommodate the traffic, which do not block crawlers (such as according to "robots.txt" files commonly available from webpage servers), which experience greater traffic from users, and which experience more change in content.

Conventional search engines, however, are not focused on price and product information. If a price changes on a webpage, but the rest of the webpage remains the same, traditional crawlers (or the queue manager) will not prioritize the webpage position in the queue, generally because the price is a tiny fraction of the overall content and the change is not labeled as being significant; conversely, if the webpage changes, but the price and/or product information remains the same, the change in webpage content may cause a traditional crawler to prioritize the webpage position in the queue due to the overall change in content, notwithstanding that that price and product information remained the same.

Conventional search engines, if presented with a query, will find corresponding products. For example, it is possible to search for "men's shoes" and to then be presented with a webpage comprising search results for hundreds of thousands of webpages for men's shoes. The search result may further be narrowed by category of men's shoes, brand, and store. Search engines have been incorporated into online stores, wherein a user may search for products, by keyword and/or by category and results can be ordered by price.

Price history, however, is only narrowly viewed and, when it is, never in the context of a rich attribute set which explores, in detail, which attributes are associated with changes in price. Price histories are not made available in real time, and do not allow intricate comparisons based on stores, merchants, brands, regions, time/date, and other dimensions.

When product and price data is obtained from a large number of webpages, when the webpages contain a large number of records, and when data from the large number of records is processed to discover product and price relationships which can only be teased out via data sets encompassing large swaths of economic activity, batch-based data ingestion and indexing processes which occur across days and cascading analytic dependencies will introduce delays. Such delays prevent the resulting corpus from being searched in close-to-real time. Customers who desire to have new webpages searched and to benefit from discovering product and price relationships will be frustrated by batch process and cascading dependency delays; such customers will have reduced confidence that product and price relationships are up-to-date.

DETAILED DESCRIPTION

Figure 1:
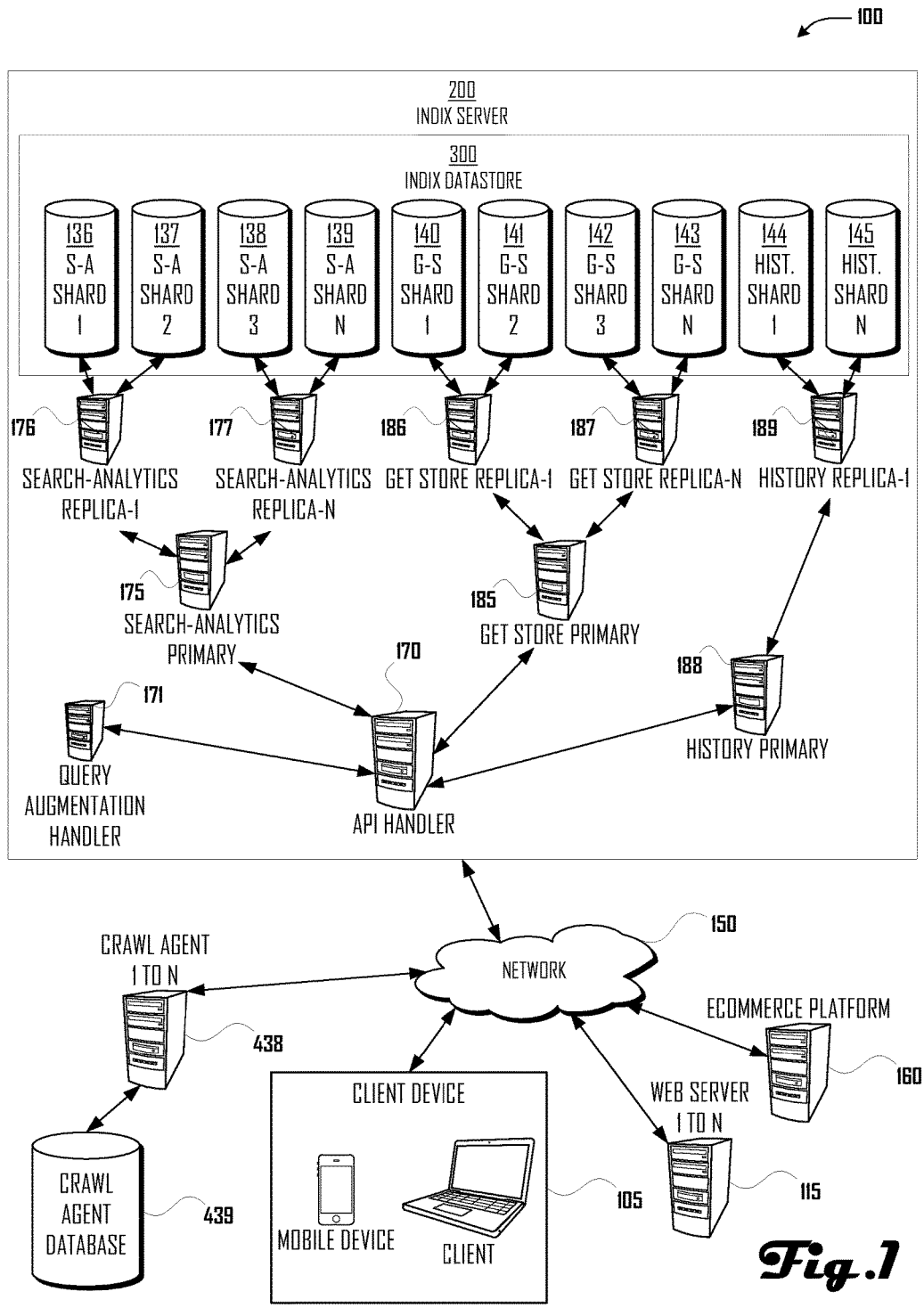
FIG. 1 is a network and device diagram illustrating exemplary computing devices configured according to embodiments disclosed in this paper.

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to". As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Certain elements appear in various of the Figures with the same capitalized element text, but a different element number. When referred to herein with the capitalized element text but with no element number, these references should be understood to be largely equivalent and to refer to any of the elements with the same capitalized element text, though potentially with differences based on the computing device within which the various embodiments of the element appears.

As used herein, a Uniform Resource Identifier ("URI") is a string of characters used to identify a resource on a computing device and/or a network, such as the Internet. Such identification enables interaction with representations of the resource using specific protocols. "Schemes" specifying a syntax and associated protocols define each URI.

The generic syntax for URI schemes is defined in Request for Comments ("RFC") memorandum 3986 published by the Internet Engineering Task Force ("IETF"). According to RFC 3986, a URI (including a URI) consists of four parts: <scheme name>: <hierarchical part>[?<query>] [#<fragment>]

A URI begins with a scheme name that refers to a specification for assigning identifiers within that scheme. The scheme name consists of a letter followed by any combination of letters, digits, and the plus ("+"), period ("."), or hyphen ("-") characters; and is terminated by a colon (":").

The hierarchical portion of the URI is intended to hold identification information that is hierarchical in nature. Often this part is delineated with a double forward slash ("//"), followed by an optional authority part and an optional path.

The optional authority part holds an optional user information part (not shown) terminated with "@" (e.g. username:password@), a hostname (i.e., domain name or IP address, here "example.com"), and an optional port number preceded by a colon ":".

The path part is a sequence of one or more segments (conceptually similar to directories, though not necessarily representing them) separated by a forward slash ("/"). If a URI includes an authority part, then the path part may be empty.

The optional query portion is delineated with a question mark and contains additional identification information that is not necessarily hierarchical in nature. Together, the path part and the query portion identify a resource within the scope of the URI's scheme and authority.

The query string syntax is not generically defined, but is commonly organized as a sequence of zero or more <key>=<value> pairs separated by a semicolon or ampersand, for example: key1=value1;key2=value2;key3=value3 (Semicolon), or key1=value1&key2=value2&key3=value3 (Ampersand)

Much of the above information is taken from RFC 3986, which provides additional information related to the syntax and structure of URIs. RFC 3986 is hereby incorporated by reference, for all purposes.

As used herein, "Product" shall be understood to mean "products or services". References to "Product Attribute" herein shall be understood to mean "product or service attribute". As used herein, "Products" are associated with iPIDs.

As used herein, an "iPID" or iPID 330 is a unique identifier assigned within the Indix System to a URI for a product, such as URI 305. An iPID 330 may be, for example, a hash of URI 305. When multiple URIs 305 from a common base domain name lead to webpages which, when parsed for Price and Product Attributes, produce the same Parse Result 325 (notwithstanding that the webpages may contain other Content which does not contribute to the Parse Result 325), such iPIDS may be labeled as equivalent in, for example, the Equivalent iPID 334 record and may be treated as the same iPID 330.

As used herein, a "Master iPID" or "MPID" or MPID 332 is an iPID 330 assigned to a group of iPIDs 330 derived from URIs 305 which lead to webpages offering the same Product for sale across all Merchants who may be selling the Product. The process of picking an iPID 330 as the MPID 332 for a group of iPID 330 records is described in greater detail in U.S. patent application Ser. Nos. 14/726,707 and 13/951,248. An MPID generally identifies a single Product, generally produced by a common manufacturer, though the Product may be distributed and sold by multiple parties.

iPIDs and MPIDSs are associated with Price Attribute 340 records and Product Attribute 345 records.

A Price Attribute 340 record may comprise one or more records comprising, for example, values which encode an iPRID which may be an identifier for a price observed at a particular time, an iPID (discussed above), a Product Name (a "Product Name" value in this record may also be referred to herein as a "Product"), a Standard Price, a Sale, a Price, a Rebate amount, a Price Instructions record (containing special instructions relating to a price, such as that the price only applies to students), a Currency Type, a Date and Time Stamp, a Tax record, a Shipping record (indicating costs relating to shipping to different locations, whether tax is calculated on shipping costs, etc.), a Price Validity Start Date, a Price Validity End Date, a Quantity, a Unit of Measure Type, a Unit of Measure Value, a Merchant Name (with the name of a merchant from whom the Product is available; a "Merchant Name" value in this record may also be referred to herein as a "Merchant"), a Store Name (a Merchant may have multiple stores; a "Store Name" value in this record may also be referred to herein as a "Store"), a User ID, a Data Channel (indicating the source of the Price Attribute 340 record, such as an online crawl, a crowdsource, a licensed supplier of price information, or from a merchant), a Source Details record (for example, indicating a URI, a newspaper advertisement), an Availability Flag, a Promotion Code, a Bundle Details record (indicating products which are part of a bundle), a Condition Type record (indicating new, used, poor, good, and similar), a Social Rank record (indicating a rank of "likes" and similar of the price), a Votes/Likes record (indicating a number of "likes" and similar which a Price or Product has received), a Price Rank record, a Visibility Indicator record (indicating whether the price is visible to the public, whether it is only visible to a Merchant, or the like), a Supply Chain Reference record (indicating whether the price was obtained from a retailer, a wholesaler, or another party in a supply chain), a Sale Location (indicating a geographic location where the product is available at the price), a Manufactured Location record (indicating where the product was produced or manufactured), a Launch Date record (indicating how long the product has been on the market), and an Age of Product record (indicating how long the product was used by the user). When capitalized herein, the foregoing terms (such as Product, Price, Merchant, Store, Source Details, etc.) are meant to refer to values in a Price Attribute 340 record.

A Product Attribute 345 record may comprise, for example, values encoding features of or describing a Product. The entire Product Attribute 345 schema may comprise thousands of columns, though only tens or hundreds of the columns may be applicable to any given Product. Often Products have industry or governmentally standardized identifiers, such as Universal Product Code ("UPC"), Stock Keeping Unit ("SKU"), Manufacturer Part Number ("MPN") or the like, which are also part of the Product Attribute 345 schema and may be present in a Product Attribute 345 record. An example set of values in a Product Attribute 345 record for a ring is as follows: Title, "Sterling Silver Diamond & Blue Topaz Ring"; Brand, "Blue Nile"; Category (such as, for example, a Category 335 in a category schema), "ring"; Metal Name, "silver"; Stone Shape, "cushion"; Stone Name, "topaz"; Width, "3 mm"; Stone Color, "blue"; Product Type, "rings," Birthstone, "September"; Setting Type, "prong"; SKU, "CF58489CC". An example set of Product Attributes 345 for a shoe is as follows: Brand, "Asics"; Category (such as, for example, a Category 335 in a category schema or taxonomy), "Men's Sneakers & Athletic"; Shoe Size, "8"; Product Type, "wrestling shoes," Color, "black"; Shoe Style, "sneakers"; Sports, "athletic"; Upper Material, "mesh"; SKU, "314194 009". When capitalized herein, the foregoing terms (such as Brand, Category, Metal Name, Product Type, etc.) are meant to refer to values in a Product Attribute 345 record.

As used herein, "Content" comprises text, graphics, images (including still and video images), audio, graphical arrangement, and instructions for graphical arrangement, including HTML and CSS instructions which may, for example, be interpreted by browser applications.

As used herein, "Event" is information generally in news or current events. Events may be found in Content. Listing Pages, Product Pages, and Event Pages are all examples of Webpage Types 350. As used herein, Event Attribute 374 is a record of or relating to an Event, and may record, for example, a sentiment, a time/date, and the like.

As used herein, "PriceDNA" comprises a Product Attribute 345 record, one or more Price Attribute 340 records, the output of the Core Price Module 500 (generally found in the Core Price 380 records), and the output of the Insight Module 600 (generally found in Insight 375 records).

As used herein, a "Brand" is a family or group of Products sold by or under a common trademark, such as the "Nike®". Brand, which sells under this trademark a family of shoes, exercise equipment, and other apparel. Brand is a value within a Product Attribute 345 record.

As used herein, a "Store" is an online or physical sales venue. A Store is a value within a Price Attribute 340 record.

As used herein, a "Merchant" is an operator of one or more Stores. A Merchant is a value in a Price Attribute 340 record.

Generally, Analysis Module 400 performs Data Ingestion Module 1800 and User Contact Module 1700. Data Ingestion Module 1800 imports Price Attribute 340 and Product Attribute 345 records into the Indix Database 300 and Get Store Primary 185 shortly after the records are produced following a crawl of webpages accessed via the URIs 305.

Data Ingestion Module 1800 merges the records, performs Core Price Module 500 to develop core price information, such as changes in price, and exports the records and the result of Core Price Module 500 to Search-Analytics Primary 175. The result of Core Price Module 500 may be searched and accessed by users in close to real-time, such as within one second of when a webpage is crawled. Data Ingestion Module 1800 also performs Insight Module 600. Insight Module 600 comprises a set of sub-modules for deriving additional information from Price Attribute 340 and Product Attribute 345 records and from the output of Core Price Module 500. Generally, Insight Module 600 identifies what Product Attributes 345 and Price Attributes 340 across the datasets are associated with the changes in price. The output of Insight Module 600 is also stored in the Indix Database 300 in Search-Analytics Primary 175 and may be searched and accessed by users in close to real-time.

The output of Core Price Module 500 and Insight Module 600 are dependent on many cascading analytic dependencies; for example what Products are higher or lower priced than a given Product? To answer such a question reliably requires processing information from all available webpages; if the answer cannot place a newly crawled webpage into this context, then a party who submitted the new webpage to be crawled and who has to wait for the answer will be less than confident that the result is up to date with other changes.

User Contact Module 1700 allows users to search and obtain information and to set alerts relative to the information in the Indix Database 300.

FIG. 1 is a network and device diagram illustrating exemplary computing devices configured according to embodiments disclosed in this paper. Illustrated in FIG. 1 are an Indix Server 200, within Indix Server 200, API Handler 170, Query Augmentation Handler 171, History Primary 188, Get Store Primary 185, and Search-Analytics Primary 175.

API Handler 170 may receive and route API calls between various of the other computers; API Handler 170 may have a primary and replicas.

Query Augmentation Handler 171 may weight components of queries for trending terms and may augment or weight such terms within a query and/or the results of the query; Query Augmentation Handler 171 may have a primary and replicas. Query Augmentation Handler 171 is discussed further herein.

History Primary 188 may store historic records, such as historic Get Store records from Get Store Primary 185 and, optionally, historic Search and Analytics records from Search-Analytics Primary 175. History Primary 188 is illustrated as having History Replica-1 189, which device is connected to History Shard 1 144 and History Shard N 145. History Primary 188 may connect directly to the illustrated Shards; one or more replicas of History Primary 188 may be used. Actions may be delegated by a primary to a replica. Shard Map 393 may be used to log which records are stored where; multiple instances of Shard Map 393 may be used.

Get Store Primary 185 is illustrated as connecting to, for example, Get Store Replica-1 186 and Get Store Replica-N 187. Get Store Replica-1 186 is illustrated as connecting to, for example, G-S Shard 1 140 and G-S Shard 2 141 while Get Store Replica-N 187 is illustrated as connecting to, for example, G-S Shard 3 142 and G-S Shard N 143. The Get Store (or "G-S") devices may store, for example, granular, highly detailed, complete current Price Attribute 340 and Product Attribute 345 records, including iPID 330, URI 305, image-URIs, and the like. The Get Store devices are discussed further herein. Actions may be delegated by a primary to a replica. Shard Map 393 may be used to log which records are stored where; multiple instances of Shard Map 393 may be used.

Search-Analytics Primary 175 is illustrated as connecting to, for example, Search-Analytics Replica-1 176 and Search-Analytics Replica-N 177. Search-Analytics Replica-1 176 is illustrated as connecting to, for example, S-A Shard 1 136 and S-A Shard 2 137 while Search-Analytics Replica-N 177 is illustrated as connecting to, for example, S-A Shard 3 138 and S-A Shard N 139. The Search and Analytics ("S-A") devices may store, for example, the following types of records: Product Title 395 Tokens, the output of Core Price Module 500 (such as Core Price 380 records), the output of Insight Module 600 (Insight 375 records), MPID 332 and iPID 330 record values (which may be used to find corresponding records in Get Store Primary 185 and/or Get Store Replica-1 186 to -N 187), and other records which are not granular or detailed in nature, but are the result of processing granular records (such as Price Attribute 340 and Product Attribute 345 records). Historic records, such as historic Core Price 380 and Insight 375 records may be moved to History Primary 188 and/or History Replica-1 189. The Search and Analytics devices are discussed further herein.

Actions may be delegated by a primary to a replica. Shard Map 393 may be used to log which records are stored where; multiple instances of Shard Map 393 may be used.

Indix Database 300 is illustrated in FIG. 1 as comprising the S-A and G-S Shards. Indix Database 300 may comprise other records, as well. Indix Database 300 is discussed further in relation to FIG. 3.

Also illustrated in FIG. 1 is a Crawl Agent 438, representing Crawl Agents 1 to N, and a Crawl Agent Database 439. The Crawl Agent 438 and Crawl Agent Database 439 are used to crawl webpages accessed via the URIs 305.

Also illustrated in FIG. 1 is a Client Device 105, such as a mobile or non-mobile computer device. The Client Device 105 is an example of computing devices such as, for example, a mobile phone, a tablet, laptop, personal computer, gaming computer, or media playback computer. The Client Device 105 represents any computing device capable of rendering Content in a browser or an equivalent user-interface. Client Devices are used by "users". The Client Device 105 may interact with the User Contact Module 1700.

Also illustrated in FIG. 1 is a Web Server 115, which may serve Content in the form of webpages or equivalent output in response to URIs, such as URI 305.

Also illustrated in FIG. 1 is an Ecommerce Platform 160, which may provide ecommerce services, such as website and/or webpage hosting via webpage templates comprising HTML and CSS elements. Customers of Ecommerce Platform 160 may complete the webpage templates with Content and serve the webpages and websites from, for example, Web Server 115.

Interaction among devices illustrated in FIG. 1 may be accomplished, for example, through the use of credentials to authenticate and authorize a machine or user with respect to other machines.

In FIG. 1, the computing machines may be physically separate computing devices or logically separate processes executed by a common computing device. Certain components are illustrated in FIG. 1 as connecting directly to one another (such as, for example, Crawl Agent 438 to Crawl Agent Database 439), though the connections may be through the Network 150. If these components are embodied in separate computers, then additional steps may be added to the disclosed invention to recite communicating between the components.

The Network 150 comprises computers, network connections among the computers, and software modules to enable communication between the computers over the network connections. Examples of the Network 150 comprise an Ethernet network, the Internet, and/or a wireless network, such as a GSM, TDMA, CDMA, EDGE, HSPA, LTE or other network provided by a wireless service provider, or a television broadcast facility. Connection to the Network 150 may be via a Wi-Fi connection. More than one network may be involved in a communication session between the illustrated devices. Connection to the Network 150 may require that the computers execute software modules which enable, for example, the seven layers of the OSI model of computer networking or equivalent in a wireless phone network.

This paper may discuss a first computer as connecting to a second computer (such as a Crawl Agent 438 connecting to the Indix Server 200) or to a corresponding datastore (such as to Indix Database 300); it should be understood that such connections may be to, through, or via the other of the two components (for example, a statement that a computing device connects with or sends data to the Indix Server 200 should be understood as saying that the computing device may connect with or send data to the Indix Database 300). References herein to "database" should be understood as equivalent to "datastore". Although illustrated as components integrated in one physical unit, the computers and databases may be provided by common (or separate) physical hardware and common (or separate) logic processors and memory components. Though discussed as occurring within one computing device, the software modules and data groups used by the software modules may be stored and/or executed remotely relative to any of the computers through, for example, application virtualization.

Figure 2:
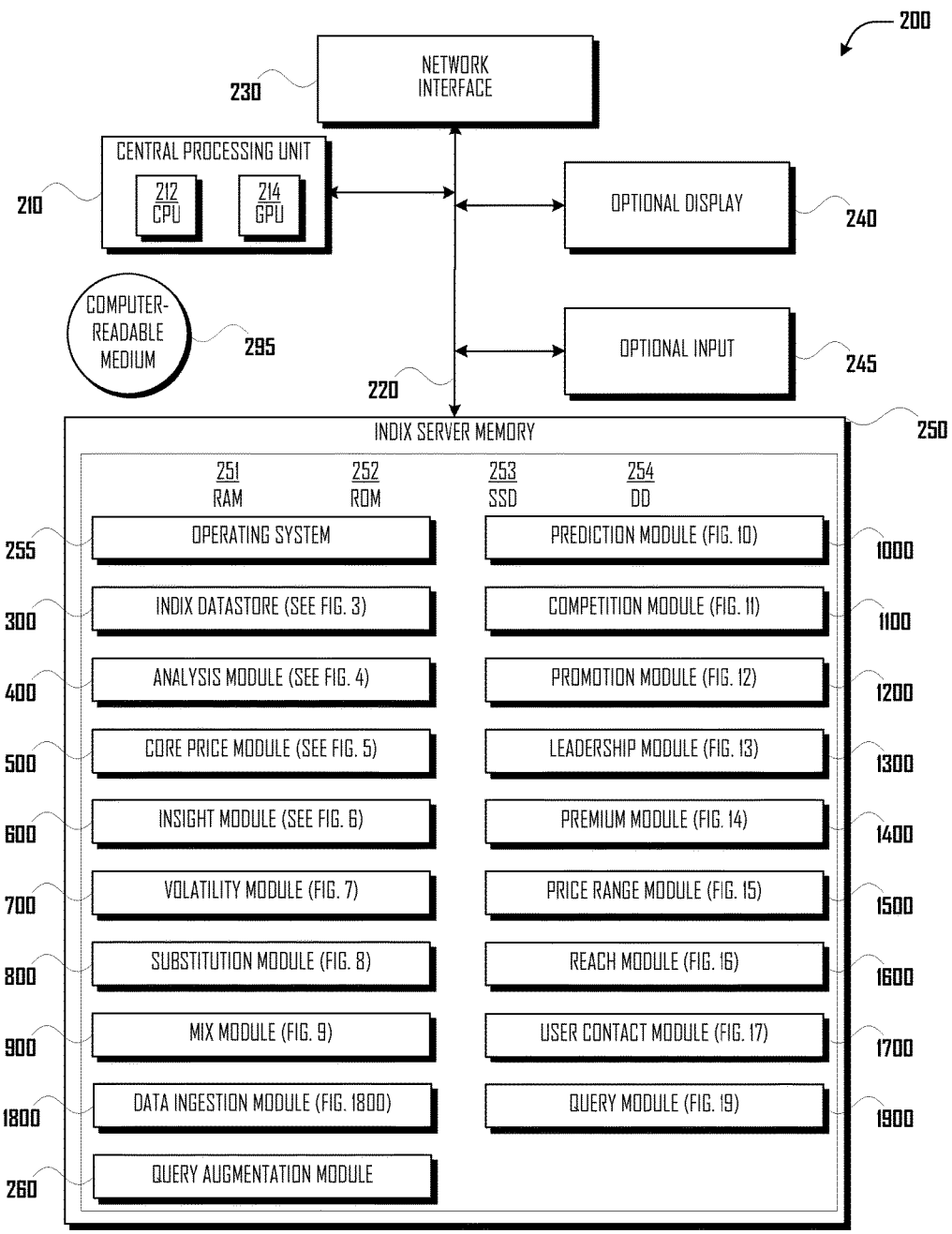
FIG. 2 is a functional block diagram of an exemplary Indix Server 200 computing device and some data structures and/or components thereof.

FIG. 2 is a functional block diagram of an exemplary Indix Server 200 computing device and some data structures and/or components thereof. Indix Server 200 in FIG. 2 comprises at least one Processing Unit 210, Indix Server Memory 250, a Display 240 and Input 245, all interconnected along with the Network Interface 230 via a Bus 220. Processing Unit 210 may comprise one or more general-purpose Central Processing Units ("CPU") 212 as well as one or more special-purpose Graphics Processing Units ("GPU") 214. The components of Processing Unit 210 may be utilized by Operating System 255 for different functions required by the modules executed by Indix Server 200. Network Interface 230 may be utilized to form connections with Network 150 or to form device-to-device connections with other computers. Indix Server Memory 250 generally comprises a Random Access Memory, RAM 251, a Read Only Memory, ROM 252, and a permanent mass storage device, such as a Disk Drive or SDRAM (synchronous dynamic random-access memory), DD 254, a Solid State Drive, SSD 253, and hybrids thereof. As discussed herein, data which requires very fast access time may be held in RAM 251, data requiring fast access time may be held in SSD 253, and other data may be held in DD 254, taking advantage of the different read/write speeds and the different costs and memory density of these different types of memory.

Indix Server Memory 250 stores program code for software modules, such as, for example, Analysis Module 400, Core Price Module 500, Insight Module 600, Volatility Module 700, Substitution Module 800, Mix Module 900, Prediction Module 1000, Competition Module 1100, Promotion Module 1200, Leadership Module 1300, Premium Module 1400, Price Range Module 1500, Reach Module 1600, User Contact Module 1700, Data Ingestion Module 1800, Query Module 1900, and Query Augmentation Module 260 as well as, for example, browser, email client and server modules, client applications, and database applications (discussed further below). Additional data groups for routines and modules, such as for a webserver and web browser, may also be present on and executed by Indix Server 200 and the other computers illustrated in FIG. 1. Webserver and browser modules may provide an interface for interaction among the computing devices, for example, through webserver and web browser modules which may serve and respond to data and information in the form of webpages and html documents or files. The browsers and webservers are meant to illustrate machine- and user-interface and user-interface enabling modules generally, and may be replaced by equivalent modules for serving and rendering information to and in interfaces in a computing device (whether in a web browser or in, for example, a mobile device application).

In addition, Indix Server Memory 250 also stores an Operating System 255. These software components may be loaded from a non-transient Computer Readable Storage Medium 295 into Indix Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

Computing device 200 may also comprise hardware supporting input modalities, Input 245, such as, for example, a touchscreen, a camera, a keyboard, a mouse, a trackball, a stylus, motion detectors, and a microphone. Input 245 may also serve as a Display 240, as in the case of a touchscreen display which also serves as Input 245, and which may respond to input in the form of contact by a finger or stylus with the surface of Input 245.

Figure 3:
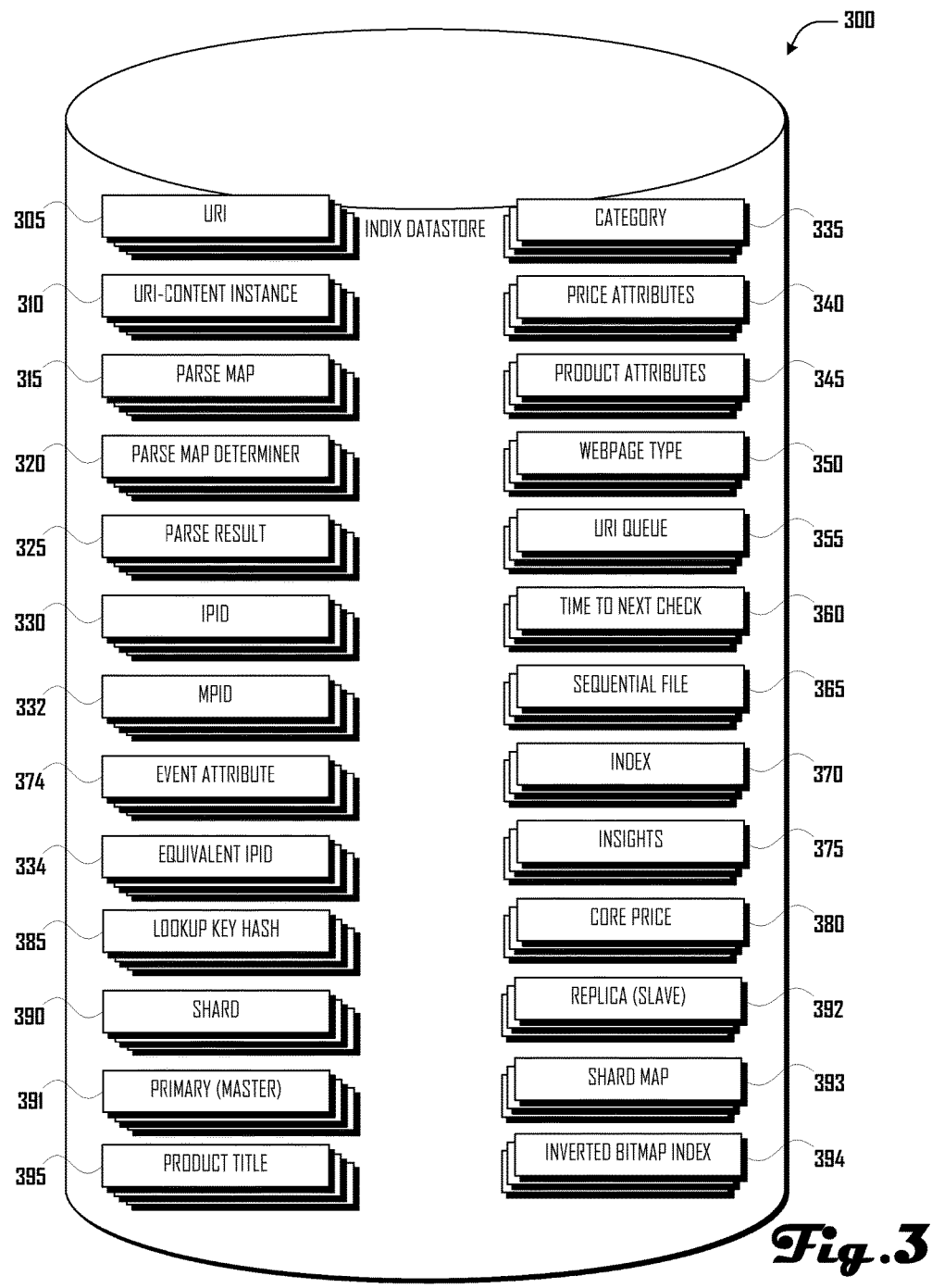
FIG. 3 is a functional block diagram of the Indix Datastore 300 illustrated in the computing device of FIG. 2.

Computing device 200 may also comprise or communicate via Bus 220 with Indix Datastore 300, illustrated further in FIG. 3. In various embodiments, Bus 220 may comprise a storage area network ("SAN"), a high speed serial bus, and/or via other suitable communication technology. In some embodiments, Indix Server 200 may communicate with Indix Datastore 300 via Network Interface 230. Indix Server 200 may, in some embodiments, include many more components than those shown in this Figure. However, it is not necessary that all of these generally conventional components be shown in order to disclose an illustrative embodiment.

FIG. 3 is a functional block diagram of Indix Datastore 300 illustrated in the computing device of FIG. 2. The components of Indix Datastore 300 are data groups used by modules and are discussed further herein in the discussion of other of the Figures. The data groups used by modules illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
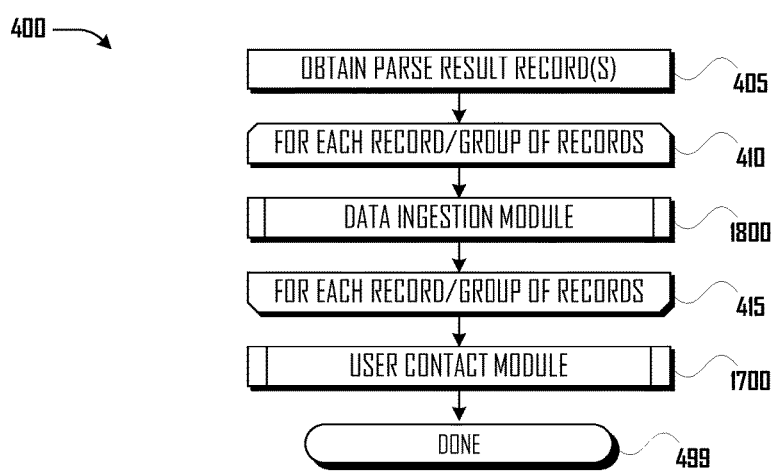
FIG. 4 is a flowchart illustrating an embodiment of an Analytics Module.

FIG. 4 is a flowchart illustrating an embodiment of an Analytics Module 400. The Analytic Module 400 may be performed by, for example, Indix Server 200.

At block 405, Analytic Module 400 obtains a new set of Parse Result 325 records, such as Parse Result 325 records produced by, for example, Parser Routine 700 described in U.S. patent application Ser. Nos. 14/726,707, 13/951,244, and U.S. provisional patent application No. 61/675,492 (incorporated herein and in the present document's cross-reference to related applications). Such records may comprise Price Attribute 340 and Product Attribute 345 records, which records are obtained from a crawl of a URI 305, which URI 305 has a derived iPID 330 (which may be a hash of URI 305), and with an assigned MPID 332 and Category 335. This may occur as frequently as URIs 305 are crawled and webpages therefrom parsed into Parse Results 325.

Opening loop block 410 to closing loop block 415 may iterate for sets of Parse Result 325 records of block 405. Sets of Parse Result 325 records may be sets comprising, for example, Parse Result 325 records obtained from crawls of a common parent domain name or a group of domain names which are known to be used by the same Store or Merchant.

At block 1800, Analytics Module 400 may execute Data Ingestion Module 1800. As described further herein, Core Price Module 500 and Insight Module 600 may be executed by or as part of Data Ingestion Module 1800, such that the results therefrom may be stored, indexed, and may be made available to be searched and found substantially as Parse Result 325 records are obtained.

At block 1700, Analysis Module 400 performs User Contact Module 1700. Utilizing User Contact Module 1700, users may query the Indix Database 300 and set alerts. User Contact Module 1700 may execute Query Module 1900, which allows search and recovery of the results of Core Price Module 500 and Insight Module 600 substantially as Parse Result 325 records are obtained.

At concluding block 499, Analysis Module 400 may conclude or return to a process which spawned it.

Figure 5:
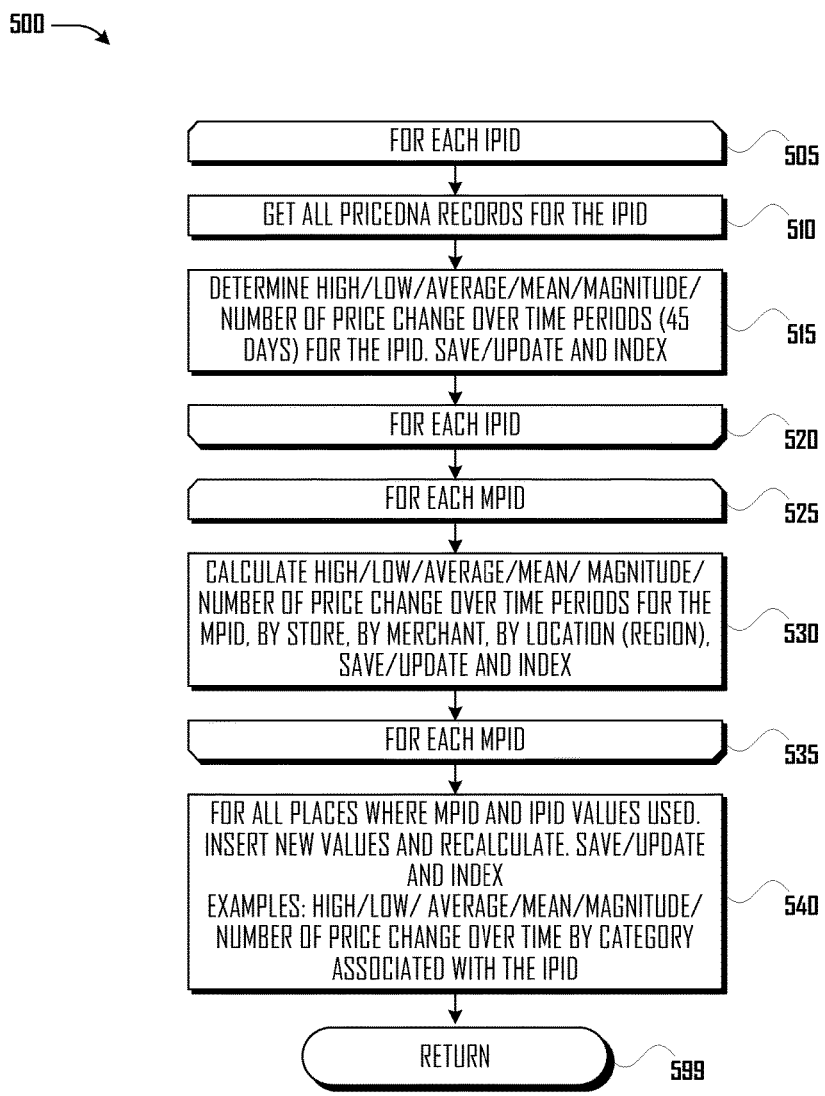
FIG. 5 is a flowchart illustrating an embodiment of a Core Price Module.

FIG. 5 is a flowchart illustrating an embodiment of Core Price Module 500. Core Price Module 500 may be called or spawned by Data Ingestion Module 1800. Opening loop block 505 to closing loop block 520 may iterate for each iPID 330 with a new Price Attribute 340 record in the record or group of records processed by Data Ingestion Module 1800.

At block 510 current Price Attribute 340 records and previous PriceDNA associated with the iPID 330 may be obtained, including a new Price Attribute 340 record and, if not already present in a stored formula, historic records (and/or summary values derived therefrom), such as from History Primary 188.

At block 515, the high, low, average, mean, magnitude, and number of price values over several time periods for the iPID 330 may be calculated. A default time period may be 45 or 30 days, though these values may be calculated for several time periods. This may be performed, for example, by saving the Price Attribute 340 record values and re-executing a formula, which formula may call such saved record values. The result may be saved, for example, to the Core Price 380 records.

At closing loop block 520, Core Price Module 500 may return to opening loop block 505 to iterate over the next iPID.

Opening loop block 525 to closing loop block 535 may iterate for each MPID 322 associated with an iPID 330 in the record or group of records of blocks being processed by Data Ingestion Module 1800. At block 530, the high, low, average, mean, magnitude, and number of price values over several time periods may be calculated for the MPID 332 utilizing the new value associated with the iPID 330 from block 515. The iPID 330 may be a hash of a URI 305 and the result of block 515 is thus limited to a particular sales channel (typically a Store) for a particular Product (taking into account that duplicate iPIDs 330 from a base domain name may be treated as equivalent); an MPID 332 is assigned to all iPIDS 330 which represent the same Product, so the MPID version of this calculation in block 530 returns values relating to the Product across Stores, Merchants, Locations, etc. The calculation of block 530 may return values which are or may be sorted by, for example, Store, Merchant, Location (such as Region), and by time periods such as a Season. The output may be saved, for example, to the Core Price 380 records, and indexed. At closing loop block 535, Core Price Module 500 may return to opening loop block 525 to iterate over the next MPID 322 associated with an iPID 330 in the record or group of records of blocks being processed by Data Ingestion Module 1800.

At block 540, all calculations and other modules which utilize the values for the iPID 330 from block 515 and the associated MPID 332 from block 530 may insert the new or updated values and may perform a recalculation. For example, the high, low, average, mean, magnitude, and number of price changes over time periods by Category 335, such as a Category 335 associated with the iPID 330, may be calculated. The output may be saved, for example, to the Core Price 380 records, and indexed.

Calculations or other modules which utilize the values calculated in FIG. 5 may refer to data addresses. The Core Price Module 500 may update the values stored at these data addresses, which causes the calculations or other modules to update their output, when such calculations or other modules are (re)executed, such on a schedule or on the occurrence of an event.

At block 599, the Core Price Module 500 may return, for example, to Data Ingestion Module 1800, which may return to Analysis Module 400.

Figure 6:
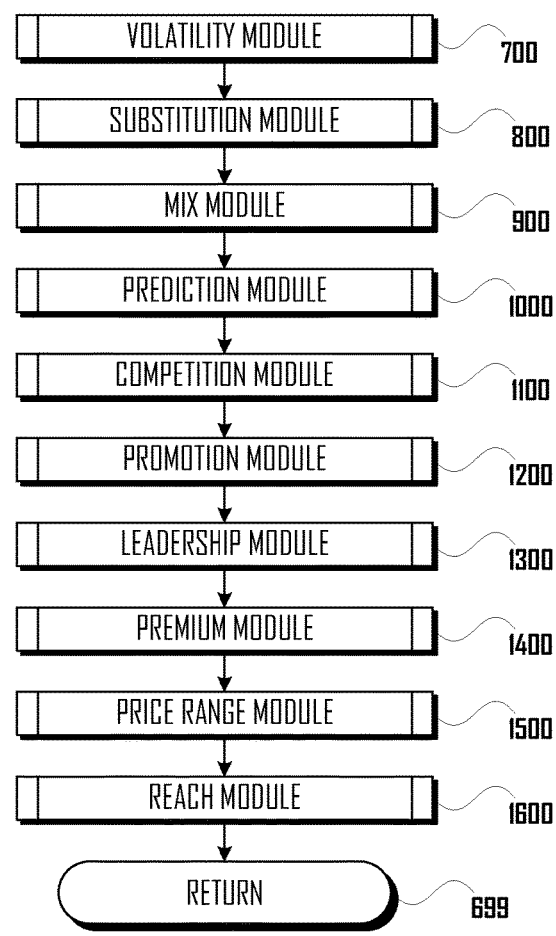
FIG. 6 is a flowchart illustrating an embodiment of an Insights Module.

FIG. 6 is a flowchart illustrating an embodiment of Insights Module 600.

Insights Module 600 may perform one or more of a set of sub-modules. At block 700, Volatility Module 700 may be performed to determine the volatility of prices relative to the many dimensions available in the PriceDNA. At block 800, Substitution Module 800 may determine substitutes for an iPID 330, MPID 332, or Category 335. At block 900, Mix Module 900 determines "how many" relative to the many dimensions available in the PriceDNA. At block 1000, Prediction Module 1000 makes price predictions relative to the many dimensions available in the PriceDNA. At block 1100, Competition Module 1100 determines competitors relative to a Product, Store, or Brand. At block 1200, Promotion Module 1200 determines promotions relative to Products, Stores, Brand, Seasons, and other dimensions available in the PriceDNA. At block 1300, Leadership Module 1300 determines which Products lead or follow others in terms of price changes. At block 1400, Premium Module 1400 determines which Products in Category 335 charge higher (premium) prices. At block 1500, Price Range Module 1500 determines the number of price ranges and maximum and minimum for iPIDs, MPIDs, and categories. At block 1600, Reach Module 1600 determines the reach of an iPID or MPID in terms of the number of people who visit a sales venue.

At block 699, Insights Module 600 may conclude and/or return to process which spawned it.

Figure 7:
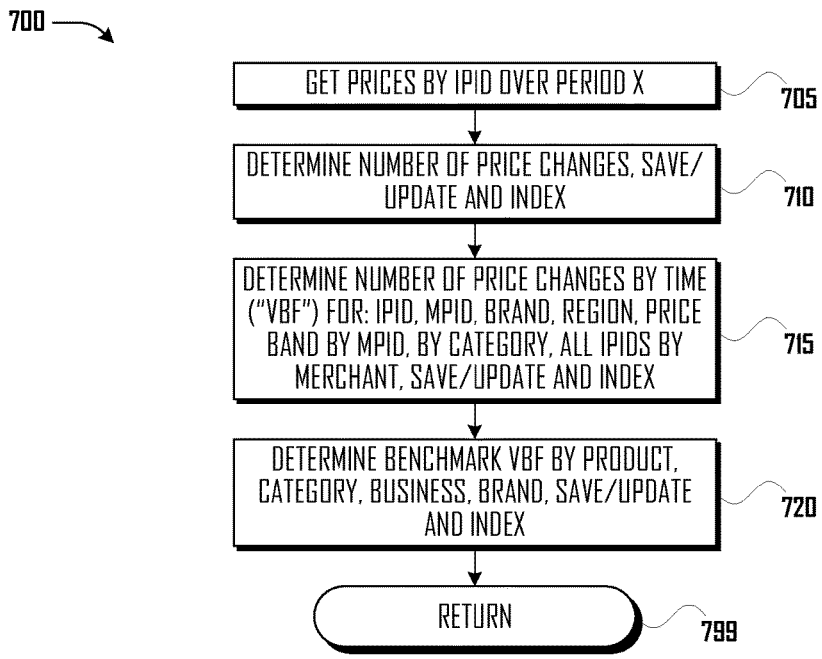
FIG. 7 is a flowchart illustrating an embodiment of a Volatility Module.

FIG. 7 is a flowchart illustrating an embodiment of a Volatility Module 700. At block 705, the Prices associated with an iPID 330 over a time period, such as 30 days, may be obtained, such as from Core Price 380 records. At block 710, the number of price changes within the time period may be determined (if this was not already a value in the Core Price 380 records). At block 715, the number of price changes within the time period ("VBF") may be determined relative to, for example, the iPID 330, relative to an MPID 332 associated with the iPID 330, relative to a Brand, relative to a Region, relative to a Price Band by MPID 332, relative to a Category 335, and relative to all iPIDs 330 associated with a Merchant. The values may be saved and indexed to accelerate access to and/or enable searching for the values and/or the values may be calculated on an as-needed basis. The values may be saved to Insight 375 records.

At block 720, the benchmark number of Price changes in the period of time may be determined. The benchmark may be, for example, the VBF relative to additional criteria, such as, for example, the VBF for a Product (or MPID), plus 1, divided by the maximum VBF of other Products in the same Category as the Product, multiplied by 100 over 101. The benchmark VBF for a Category may be determined by the VBF for the Category, plus 1, divided by the maximum VBF of the Category, multiplied by 100 over 101. The benchmark VBF for a Merchant may be the VBF of the Merchant, plus 1, divided by the maximum VBF of the Merchant, multiplied by 100 over 101. The benchmark VBF for a Brand may be the VBF of the Brand, plus 1, divided by the maximum VBF of the Brand, multiplied by 100 over 101. The values may be saved to Insight 375 records and indexed.

Figure 8A:
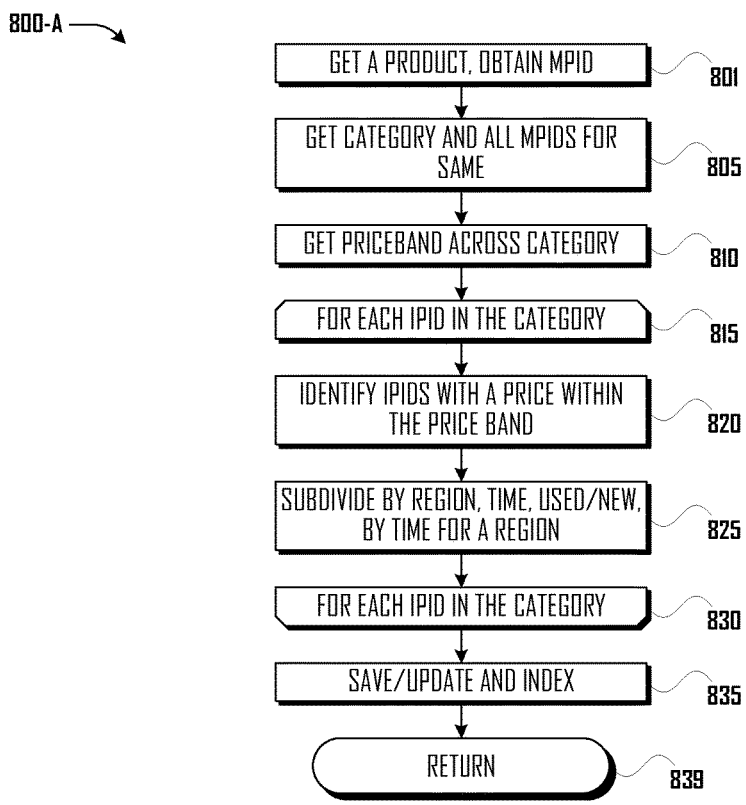
FIG. 8A is a flowchart illustrating a first embodiment of a Substitution Module.
Figure 8B:
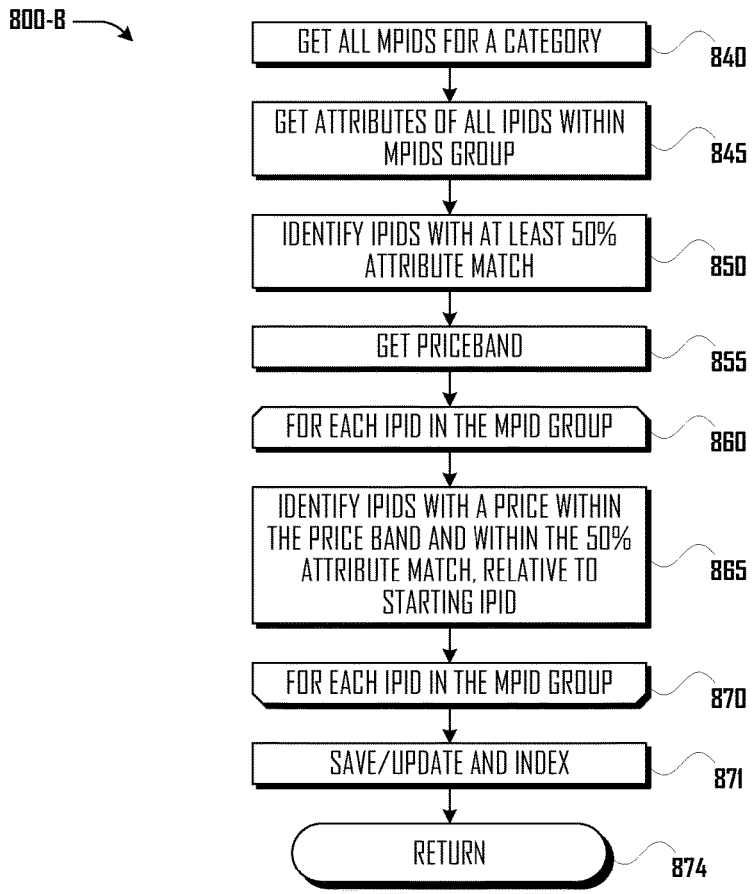
FIG. 8B is a flowchart illustrating a second embodiment of a Substitution Module.
Figure 8C:
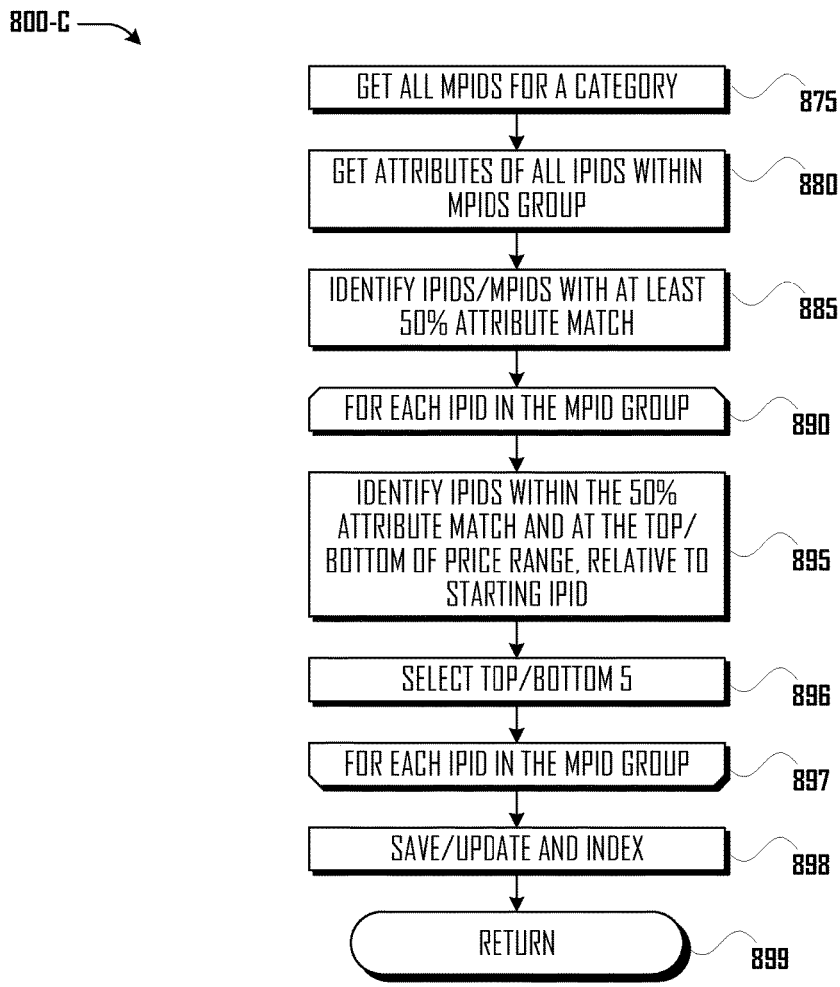
FIG. 8C is a flowchart illustrating a third embodiment of a Substitution Module.

FIGS. 8A-8C are flowcharts illustrating embodiments of Substitution Module 800, labeled as 800-A, 800-B, and 800-C. In a first example of an embodiment of Substitution Module 800 illustrated in FIG. 8A as Substitution Module 800-A, substitute Products within Category 335 are identified. At block 801, which, like other steps may be optional, a Product may be identified by, for example, a user or a module, and the MPID 332 corresponding thereto may be obtained. At block 805, a Category 335 may be obtained, whether corresponding to the Product and MPID of step 801 or via a user query or other input, and all MPIDs 332 within the Category 335 may be obtained. At block 810 a Price Band may be obtained or calculated relative to the Category 335 (such as from or according to the Price Range Module 1500); the Price Band may be selected by a user. Blocks 815 through 830 may iterate for each iPID 330 within the Category of block 805.

At block 820, the iPIDs 330 in the Category of block 805 and with a Price value within the Price Band of block 810 are identified, such as from the Core Price 380 records. At block 825, the result of block 820 may be subdivided, grouped, or filtered by Region, Time, Used/New, and according to other dimensions available in the PriceDNA. At block 830 the Substitution Module 800 may iterate over the remaining iPIDs 330 in the Category 335. At block 835, the results may be saved as Substitutes, such as to Insight 375 records. At block 839, the process may return to a process which spawned it.

In a second example of an embodiment of a Substitution Module 800 illustrated in FIG. 8B and Substitution Module 800-B, substitute Products within a Category 335 with a percentage overlap in Attributes 340/345 and within a Price Band are identified. At block 840, a Category 335 may be obtained, whether corresponding to a Product or via a user query or other input, and all MPIDs 332 within the Category 335 may be obtained. At block 845, the Product Attributes 345 of all iPIDS 330 within the MPIDs 332 may be obtained. At block 850, the Product Attributes 345 may be clustered to identify the iPIDs 330 with at least a 50% Product Attribute 345 match or overlap. At block 855 a Price Band may be obtained or calculated relative to the Category 335 (such as from or according to the Price Range Module 1500); the Price Band may be selected by a user.

Blocks 860 through 870 may iterate for each iPID 330 within the MPIDs 332 and Attribute 345 match of block 850. At block 865, the iPIDs 330 with a Price value within the Price Band of block 855 and with the Product Attribute 345 match or overlap of block 850 are identified. The result of block 865 may be subdivided or grouped further by sub-Price Ranges. At block 870 the Substitution Module 800 may iterate over the remaining iPIDs 330 in the MPIDs 332 within the Category 335. At block 871, the results may be saved as Substitutes in Insight 375 records. At block 874, the process may return.

In a third example of an embodiment of a Substitution Module 800 illustrated in FIG. 8C and Substitution Module 800-C, substitute Products within a Category 335 with a percentage overlap in Attributes 340/345 and in the top or bottom of a Price Range are identified. At block 875, a Category 335 may be obtained, whether corresponding to a Product or via a user query or other input, and all MPIDs 332 within the Category 335 may be obtained. At block 880, the Product Attributes 345 of all iPIDS 330 within the MPIDs 332 may be obtained. At block 885, the Product Attributes 345 may be clustered to identify the iPIDs 330 with at least a 50% Product Attribute 345 match or overlap.

Blocks 890 through 897 may iterate for each iPID 330 within the MPIDs 332 and Attribute 345 match of block 885. At block 895, the iPIDs 330 with the Product Attribute 345 match or overlap of block 885 and in the bottom of a Price Range or Price Band relative to the starting iPID 330 are identified. At block 896 the top or bottom five (or another subset) of block 895 may be selected. At block 897 this embodiment of the Substitution Module 800 may iterate over the remaining iPIDs 330 in the MPIDs 332 within the Category 335. At block 898, the results may be saved as Substitutes in Insight 375 records. At block 899, the process may return.

Figure 9:
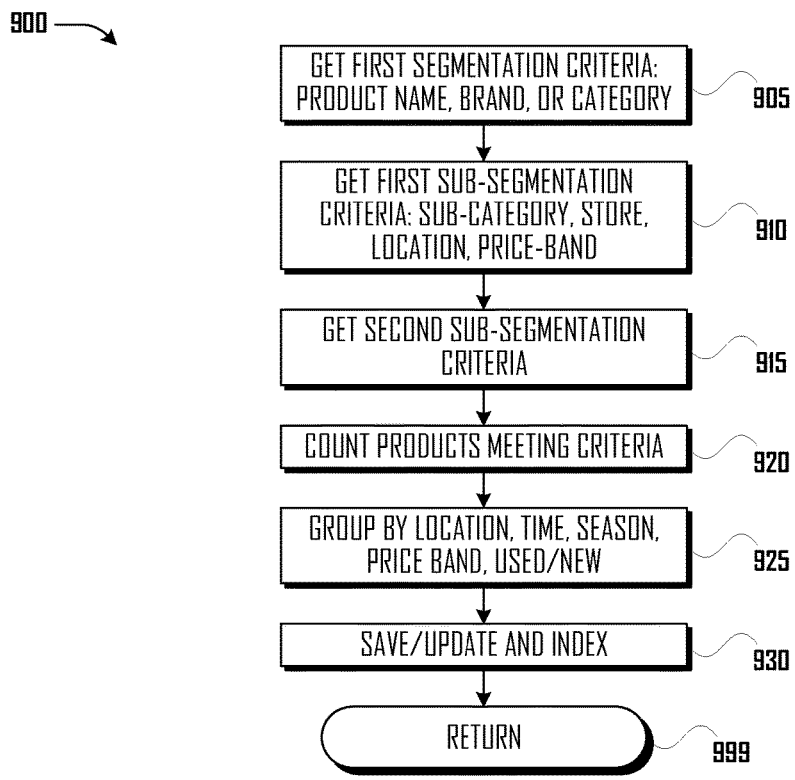
FIG. 9 is a flowchart illustrating an embodiment of a Mix Module.

FIG. 9 is a flowchart illustrating an embodiment of Mix Module 900. Mix Module 900 determines "how many" relative to the many dimensions available in the PriceDNA. At block 905, Mix Module 900 obtains a first segmentation criteria, such as, for example, a Product Name, Brand, or Category. At block 910, a first sub-segmentation criteria may be obtained, such as, for example, a Store, Location, or Price Band. At block 915, a second sub-segmentation criteria may be obtained, such as, for example, a Store, Location, or Price Band. At block 920, the number of Products, such as by MPID 332, which meet the criteria of blocks 905, 910, and 915 may be counted. At block 925, the result of block 920 may be subdivided or grouped by Location, Time, Season, Price Band, Used/New or other dimensions available in the PriceDNA. At block 930, the results of blocks 920 and/or 925 may be saved as Mix values in Insight 375 records. At block 999, the process may return.

Figure 10:
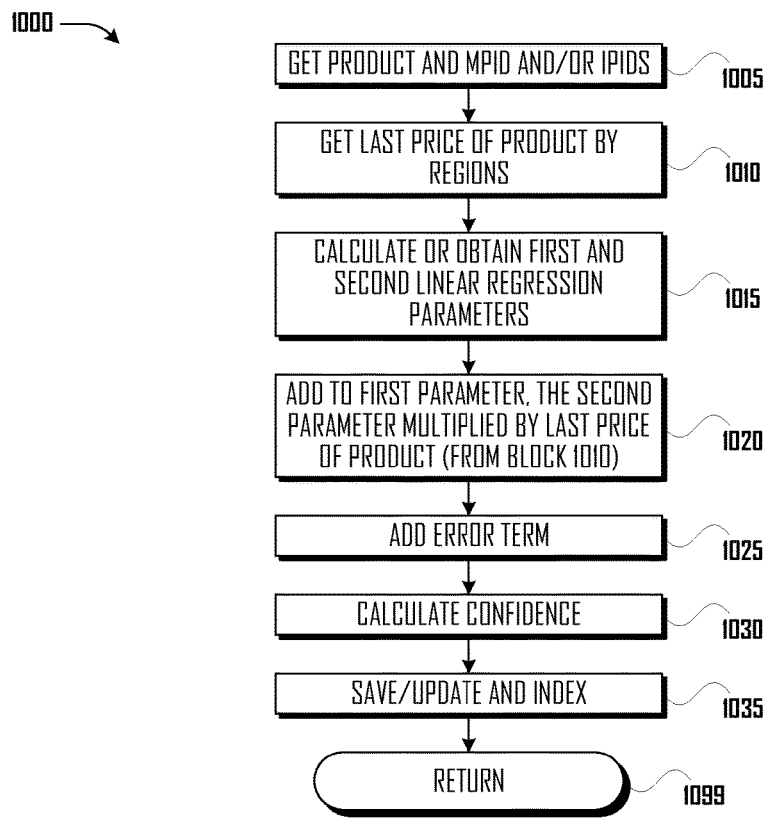
FIG. 10 is a flowchart illustrating an embodiment of a Prediction Module.

FIG. 10 is a flowchart illustrating an embodiment of Prediction Module 1000. Prediction Module 1000 makes price predictions relative to the many dimensions available in the PriceDNA. At block 1005, Prediction Module 1000 obtains a Product and obtains or identifies an MPID 332 and/or iPIDs 330 associated therewith. At block 1010, the last Price of the Product by MPID 332 and/or iPID 330 may be obtained, such as from Core Price 380 records. At block 1015, first and second linear regression parameters may be calculated or obtained.

At block 1020, to the first parameter may be added the second parameter multiplied by the last price of the Product from block 1010. At block 1025 an error term may be added to the result of block 1020. At block 1030 a confidence interval may be calculated. At block 1035 the result may be saved as Predictions in Insight 375 records. At block 1035 the Prediction Module 1000 may then return.

In FIG. 10, the predicted Price for a product may be determined according to the following equation: $p_t = \alpha + \beta p_{(t-1)} + \varepsilon$, where $p_t$ is the price at time t, $\alpha$ and $\beta$ are the parameters of the linear regression and $\varepsilon$ is the error term and is assumed to be Normally distributed. Confidence, C, is a measure that represents the chance for making 0.01% error in predicting the price of the product, C=normsdist(Z) and $$Z = \frac{.01\% * \text{Price}}{(Std \cdot \text{Error})}.$$

In this formula, the parameters of the model are estimated using the original least squares method as follows:

$$\hat{\beta} = \frac{\left(\sum p_{(t-1)} p_t + \frac{1}{n} \sum p_{(t-1)} \sum p_t\right)}{\left(\sum p_{(t-1)}^2 - \frac{1}{n} (\sum p_{(t-1)})^2\right)} \text{ and}$$

$$\hat{\alpha} = \overline{p}_t - \hat{\beta} p_{(\overline{t}-1)}$$

Figure 11:
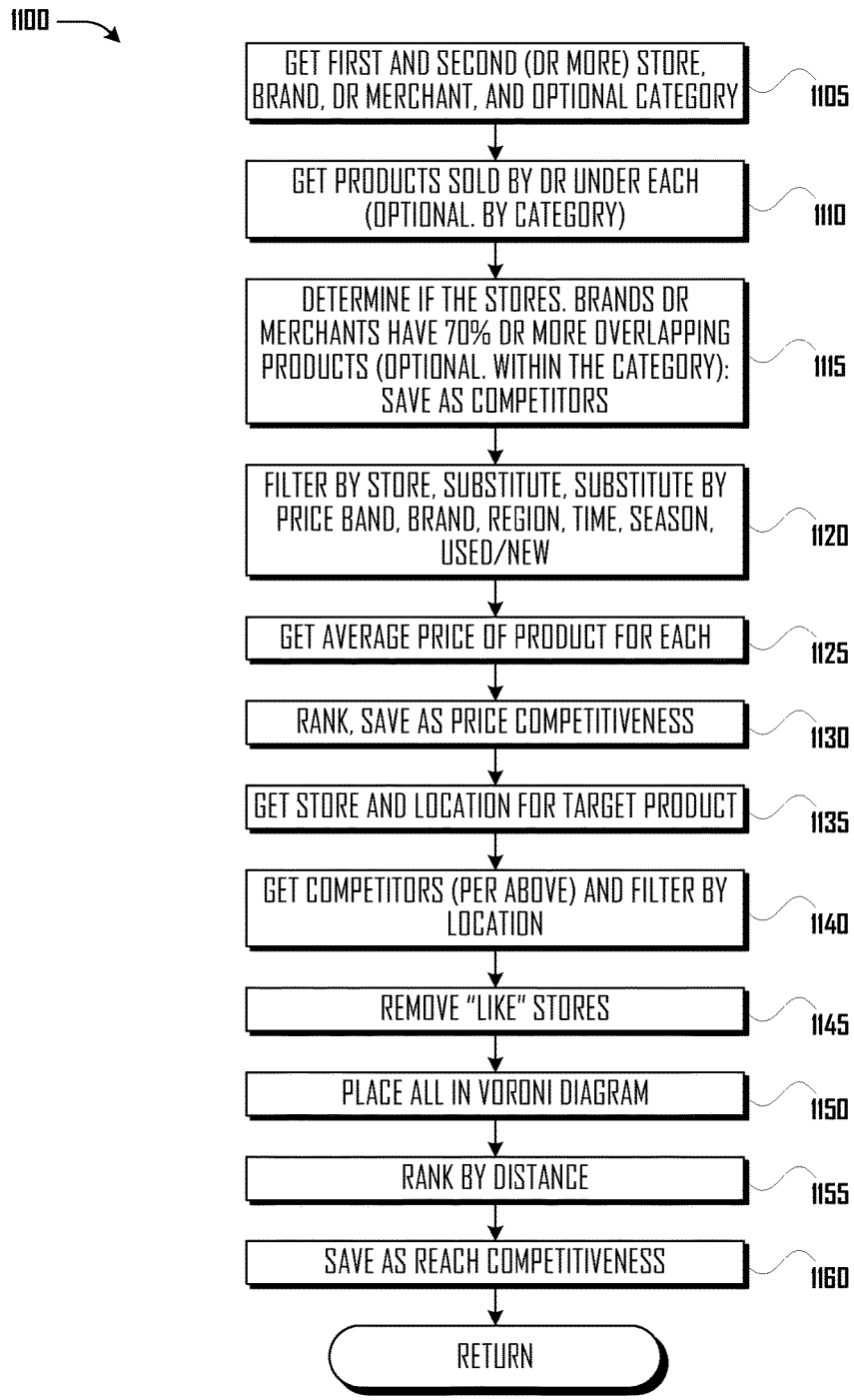
FIG. 11 is a flowchart illustrating an embodiment of a Competition Module.

FIG. 11 is a flowchart illustrating an embodiment of Competition Module 1100. Competition Module 1100 determines competitors relative to a Stores, Brands, or Merchants. At block 1105, a first and second (or more) Store, Brand, or Merchant may be obtained, along with an optional Category 335. These may be obtained from a user or another module. At block 1110, all Products sold by or under each of the entities of block 1105 may be obtained, such as from the PriceDNA. The Products may optionally be filtered by the Category of block 1105.

At block 1115, a determination may be made regarding whether or not the entities of block 1105 have 70% or more overlapping Products, per the Products of block 1110. The affirmative output of this block may be saved as Competitors in Insight 375 records.

At block 1120, the Competitors may be filtered by, for example, on or more of Store, Substitute, Substitute by Price Band, Brand, Location (including Region), Time (including Season), and whether the Products are sold as used or new. Which criteria are used in the filter may be determined by input from a user. The output of block 1120 may be saved in Insight 375 records.

At block 1125, the average price of Products in the Category 335 of block 1105 may be obtained relative to, for example, Category 335, Substitute, Substitute by Price Band, Brand, Location, Time, used/new status, and other criteria. At block 1130, the output of block 1125 may be ranked and saved as Price Competitiveness in Insight 375 records.

At block 1135, a Store and Location for a target Product may be obtained, such as from a user. At block 1145, the Competitors from block 1115 may be obtained or determined and the Competitors filtered to select only Competitors with sales in the Location of block 1135. At block 1145, Stores in the Location which are the same as the Store of block 1135 may be removed from the set of Competitors, leaving the remainder (those not removed).

At block 1150, the output of block 1150 may be placed in a Voroni Diagram or similar data structure, with the location in the Vononi Diagram being based on physical location of the Stores of the Competitors. Generally, a Voroni Diagram determines the distance between objects in a geometric manner, rather than a power-law manner. At block 1155, the distance between the target Store and each Competitor may be ranked. At block 1160, the output of block 1160 may be saved as Reach Competitiveness in Insight 375 records.

Figure 12:
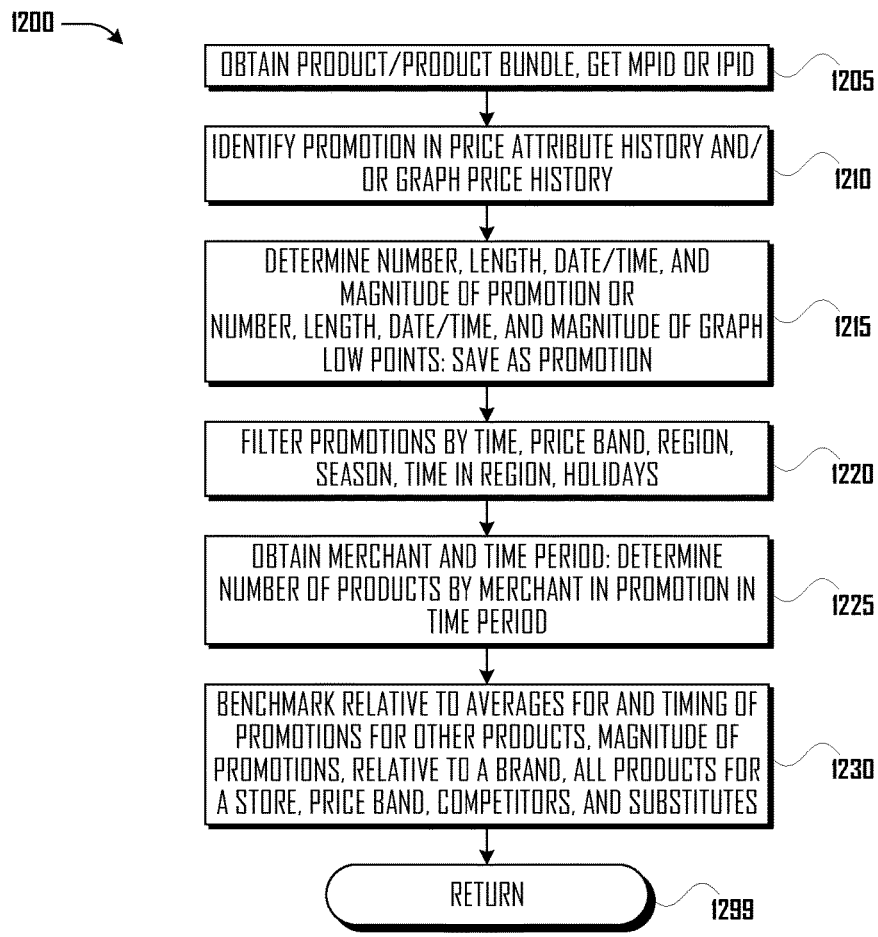
FIG. 12 is a flowchart illustrating an embodiment of a Promotion Module.

FIG. 12 is a flowchart illustrating an embodiment of Promotion Module 1200. Promotion Module 1200 determines promotions relative to Products, Stores, Brand, Seasons, and other dimensions available in the PriceDNA. At block 1205, a Product may be obtained, such as from user input, and the MPID 332 and/or an IPID 330 corresponding to the Product may be identified in the Attributes 340/345 (via, for example, the Sequential File 365). The Product may be a single Product or a Bundle comprising multiple Products. At block 1210, a "Promotion" value may be identified in the Attributes 340/345 associated with the MPID 332 and/or IPID 330; the "Promotion" value may be a Sale Price and/or a Promotion Code in the Price Attribute 340 records associated with the MPID 332 and/or IPID 330. Alternatively, at block 1210 the Price history for the MPID 332 and/or IPID 330 may be graphed.

At block 1215, the number, length, date/time, and magnitude of the Promotions may be determined and saved as Promotions in Insight 375 records. Alternatively, the number, length, date/time, and magnitude of the low-points in the graph of block 1210 may be determined and saved as Promotions in Insight 375 records. At block 1220, the output of block 1215 may be filtered by criteria such as, for example, date/time, Price Band, Location (including Region), Season, and Holidays. The criteria may be received from, for example, a user and/or a default set of criteria may be applied, with the result of each being saved in Insight 375 records.

At block 1225 a time period and a Merchant may be obtained, such as from a user; the Merchant may be associated with the Product of block 1205. At block 1225, the number of Products sold by the Merchant in Promotion during the time period may be determined.

At block 1230, the result of block 1215 may be benchmarked relative to average Promotion times, durations, and magnitude for other Products (including other Bundles of the Product), the timing of Promotions for other Products, relative to the magnitude of Promotions for other Products, relative to the Products associated with a Brand, relative to all Products sold at a Store, relative to Products in a Price Band, and relative to Competitors and Substitutes. The result may be saved in Insight 375 records.

Figure 13:
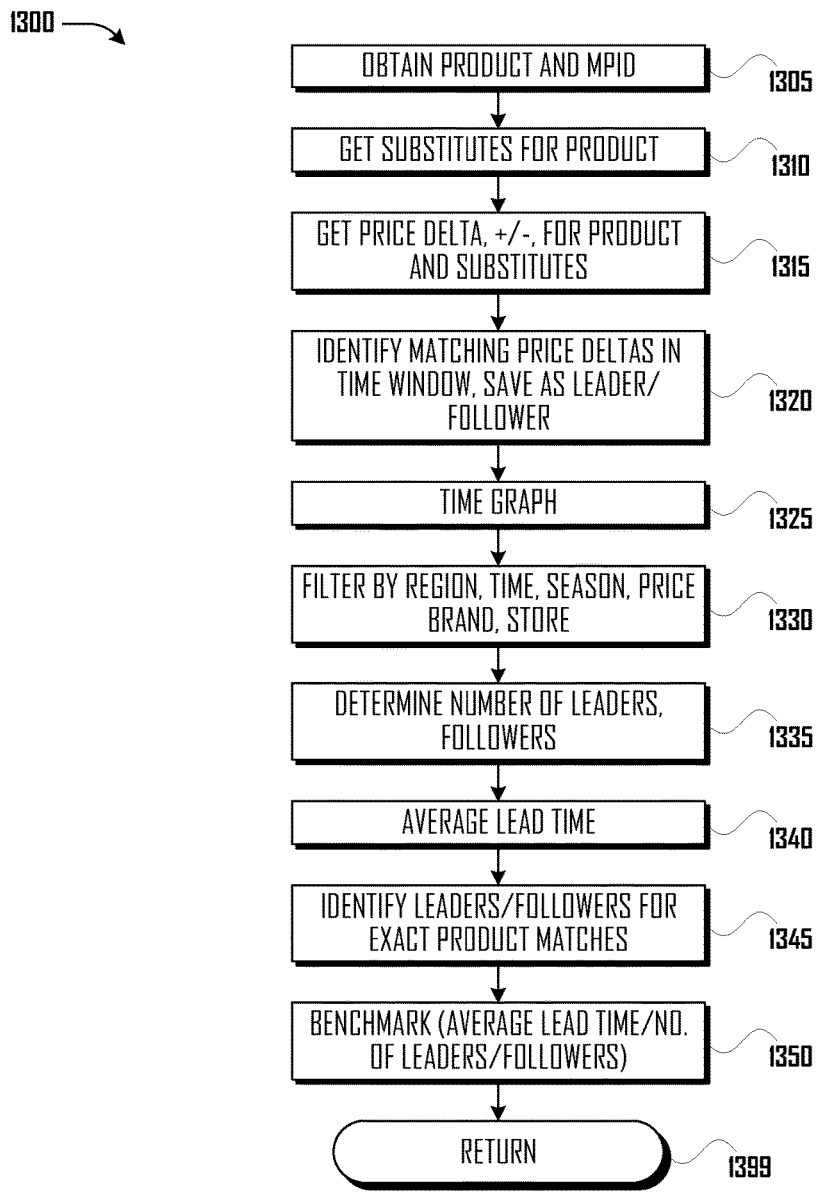
FIG. 13 is a flowchart illustrating an embodiment of a Leadership Module.

FIG. 13 is a flowchart illustrating an embodiment of Leadership Module 1300. Leadership Module 1300 determines which Products lead or follow others in terms of price changes. At block 1305, a Product may be obtained, for example, from a user or another module, and the associated MPID 332 determined. At block 1310 Substitutes for the Product may be obtained (such as from or by the Substitutes 800 module). At block 1315, the change in Price, or Price delta, for the Product and the Substitutes may be determined over periods of time. The Price delta may be determined in an absolute sense (whether the change was positive or negative) and/or with a determination of the magnitude of the Price delta.

At block 1320, the Price deltas determined at block 1315 may be matched, to determine if any of the Price deltas with the same absolute value (positive or negative) occurred within a time window of one another (deltas beyond the time window may not be considered to be correlated), with the result being saved as a Leader/Follower indication in Insight 375 records.

At block 1325, the matching Price deltas of block 1320 may be graphed according to time. At block 1330, the result of block 1325 may be filtered by criteria such as Region, Rime, Date/Time, Season, Price Band, and Store.

At block 1335, the number of Leaders and Followers may be determined relative to a time period. At block 1340, the average lead/follow time may be determined. At block 1345, leaders/followers with respect to exact Product matches (for different Stores selling the same Product, determined at block 1330) may be identified. At block 1350, the results may be benchmarked relative to the number of leaders/followers and other criteria. The result of various of the blocks in FIG. 13 may be saved in Insight 375 records. At block 1399, the Leadership Module 1300 may return.

Figure 14:
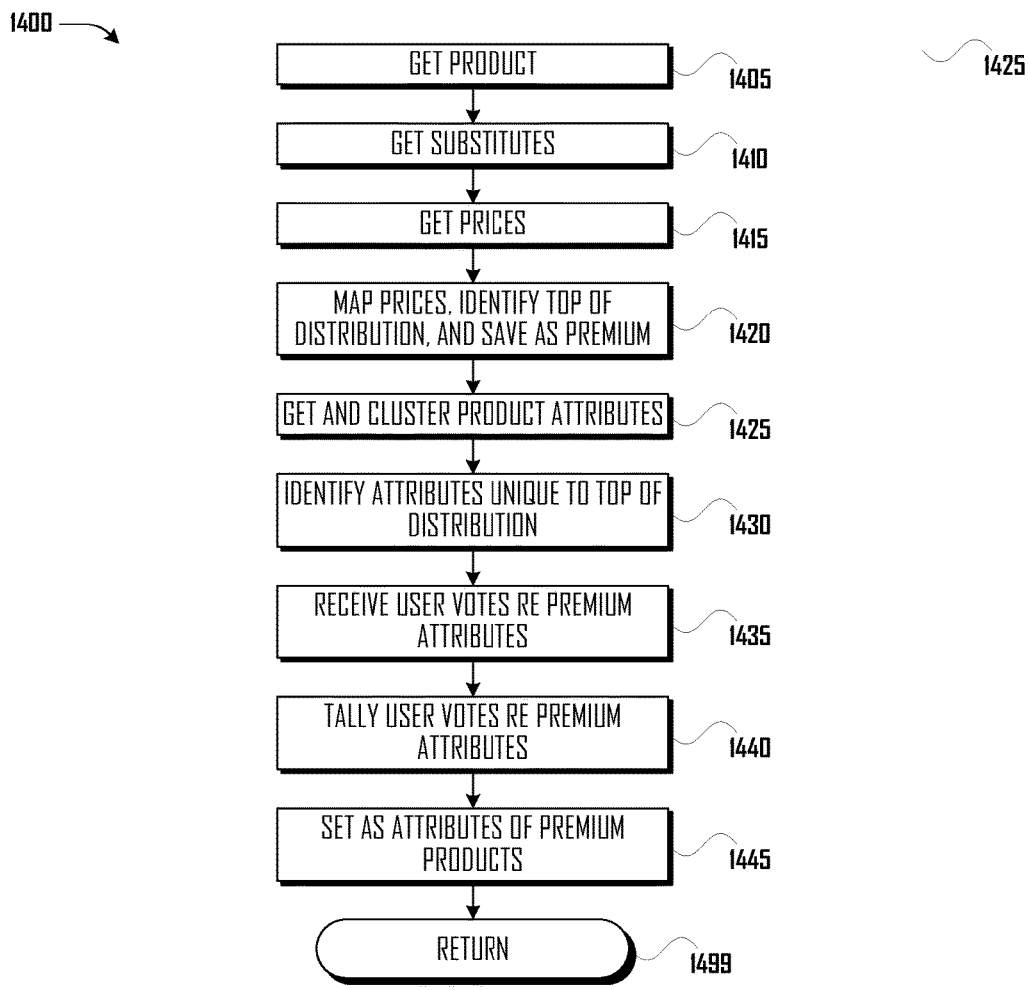
FIG. 14 is a flowchart illustrating an embodiment of a Premium Module.

FIG. 14 is a flowchart illustrating an embodiment of Premium Module 1400. Premium Module 1400 determines which Products (generally, by MPID) in a Category 335 charge higher Prices (premium). At block 1405, a Product may be received, such as from input by a user or another module. At block 1410, the Substitutes for the Product may be determined or obtained from another module, such as the Substitution 800 module and/or Insight 375 records. At block 1415, the Prices of the Product and of the Substitutes may be obtained, such as from the Core Price 380 records. At block 1420, the obtained Prices of block 1415 may be graphed or mapped and the top of the Price distribution identified. The top of the Price distribution may be the top five or ten percent or the top five Products or Substitutes may be identified and saved as the "Premium" Products in Insight 375 records.

At block 1425, the Product Attributes 345 of the Products and Substitutes of block 1410 may be obtained and clustered by similarity. At block 1430, the Product Attributes 345 unique to or dominant in the Premium Products, determined by the clusters of block 1425, may be identified and saved in Insight 375 records.

At block 1435, user votes regarding Product Attributes 345 of Premium Products may be received. At block 1440, the user votes may be tallied and, at block 1445, the "winning" Product Attributes 345 (with the most votes) may be set as the Product Attributes 345 associated with the Premium Products in Insight 375 records.

Figure 15:
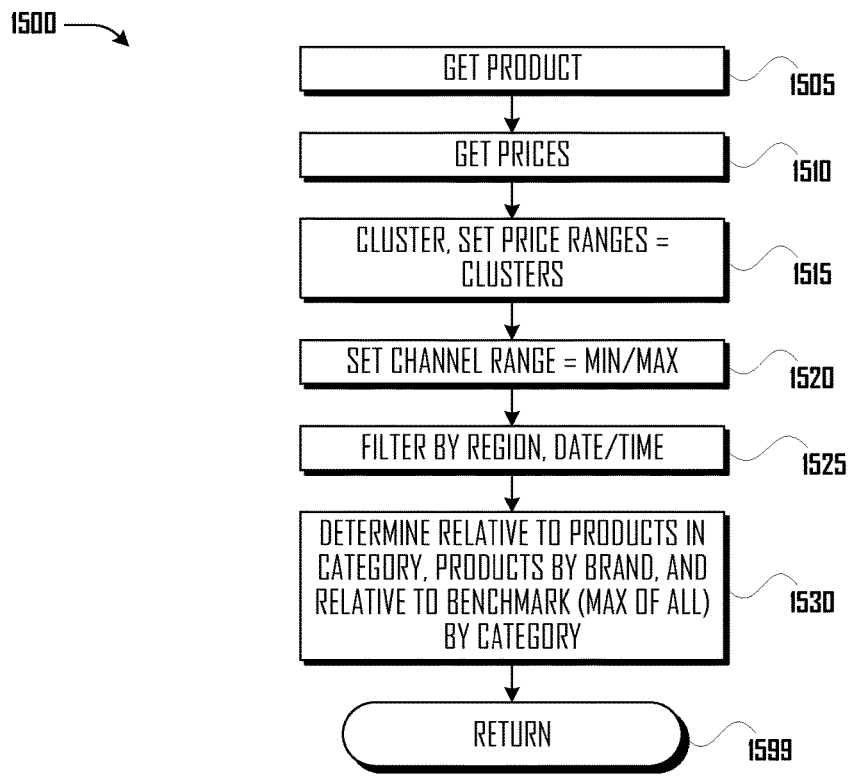
FIG. 15 is a flowchart illustrating an embodiment of a Price Range Module.

FIG. 15 is a flowchart illustrating an embodiment of Price Range Module 1500. Price Range Module 1500 determines the number of price ranges and maximum and minimum for iPIDs, MPIDs, and categories. At block 1505, a Product may be obtained, such as from a user or another module. At block 1510, the Prices for the Product may be obtained, such as from the PriceDNA for the Product. At block 1515, the Prices of block 1510 may be clustered by similarity and with a minimum cluster size, with the range in Price across each cluster being saved as Price Ranges for the Product in Insight 375 records.

At block 1520, the Channel Range for the Product may be set as the minimum and maximum of the Prices of block 1510 and saved in Insight 375 records. At block 1525, the results of blocks 1510, 1515, and 1520 may be filtered by, for example, Region, Date/Time, and according to other criteria and saved in Insight 375 records. At block 1530, the Price Ranges may be determined relative to all Products in a Category 335, all Products by a Brand, and relative to a benchmark which may be, for example, the maximum number of Price Ranges within a Category 335. The result thereof may be saved as Price Ranges in Insight 375 records.

Figure 16:
FIG. 16 is a flowchart illustrating an embodiment of a Reach Module.

FIG. 16 is a flowchart illustrating an embodiment of Reach Module 1600. Reach Module 1600 determines the reach of an iPID or MPID in terms of the number of people who visit a sales venue. At block 1605, a Product may be obtained, such as from a user or another module. At block 1610, the Stores offering the Product for sale may be obtained. At block 1615, the traffic at the stores may be obtained, such as from a source for online webpage/website traffic, such as Alexa or similar. At block 1620, the result of block 1615 may be filtered by, for example, criteria such as Date/Time (including Season), Location (including Region), Holiday, and other criteria. The result thereof may be saved as Reach in Insight 375 records. At block 1699, the Reach Module 1600 may return.

Figure 17:
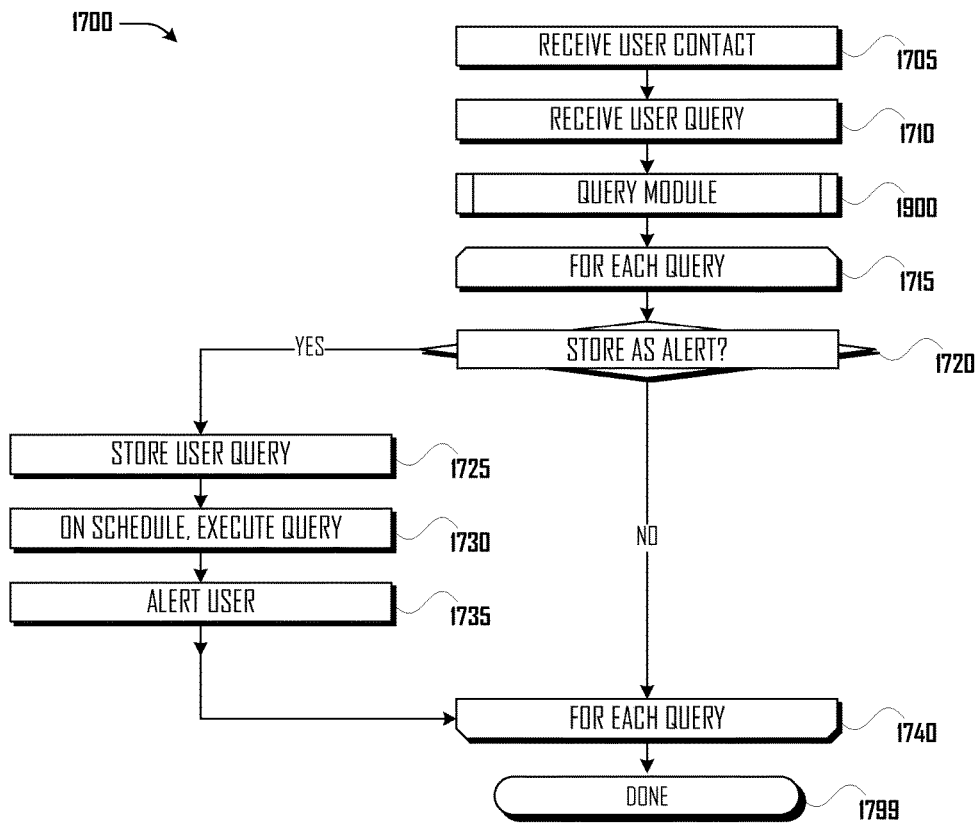
FIG. 17 is a flowchart illustrating an embodiment of a User Contact Module.

FIG. 17 is a flowchart illustrating an embodiment of User Contact Module 1700. At block 1705, a user contact with the User Contact Module 1700 may be detected. The user contact may be part of a user-interface served by User Contact Module 1700, which user-interface allows users to input queries and see results, relative to data in Indix Datastore 300. At block 1710, a user query may be received, such as for PriceDNA records and/or Insight records. At block 1900, User Contact Module 1700 may execute Query Module 1900 to execute the query and return results to the user.

Opening loop block 1715 to closing loop block 1740 may iterate for each user query. At block 1720, a determination may be made regarding whether the user has requested that the query be stored as an alert. If so, then at block 1725 a time period for the alert may be obtained or set (such as according to a default time period, such as once per day or week). At block 1730, on occurrence of the time period of block 1725, the query may be executed, such as by execution of Query Module 1900. At block 1735, an alert or other message may be sent to contact information associated with the user. At block 1799, the User Contact Module 1700 may conclude.

Figure 18:
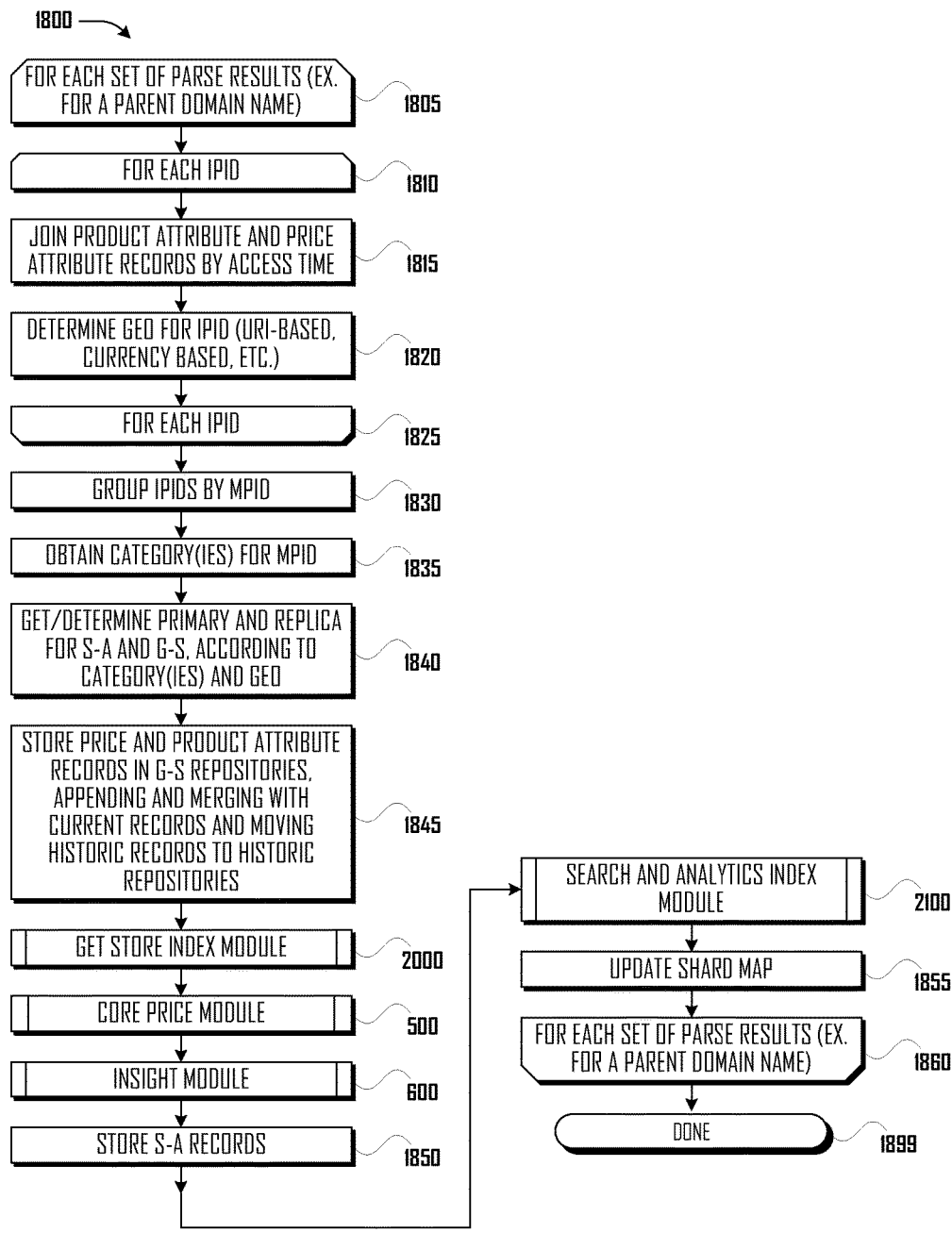
FIG. 18 is a flowchart illustrating an embodiment of a Data Ingestion Module.

FIG. 18 is a flowchart illustrating an embodiment of Data Ingestion Module 1800. Opening loop block 1805 to closing loop block 1860 may iterate for sets of Parse Result 325 records produced by, for example, Parser Routine 700 described in U.S. patent application Ser. Nos. 14/726,707, 13/951,244, and U.S. provisional patent application No. 61/675,492 (in the present document's cross-reference to related applications). The sets of Parse Result 325 records may be sets comprising, for example, Parse Result 325 records obtained from crawls of a common parent domain name or a group of domain names which are known to be used by the same Store or Merchant.

Opening loop block 1810 to closing loop block 1825 may iterate for each Parse Result 325 set of each iPID 330 within the the-current set of Parse Result 325 records, which Parse Result 325 contains Product Attribute 345 and Price Attribute 340 records.

At block 1815, Product Attribute 345 and Price Attribute 340 records with respect to the then-current iPID 330 may be joined by access time (or by such records which occur within a narrow access time window) to form one logical record reflecting the Product Attribute 345 and Price Attribute 340 records obtained with respect to the iPID 330 at one time (or narrow access time window).

At block 1820, Data Ingestion Module 1800 may determine a geographic region ("geo") associated with the iPID 330. The geo may be determined based on, for example, a country code in a URI, based on country identification in the Parse Result 325, based on currency in the Parse Result 325, or the like.

At closing loop block 1825, Data Ingestion Module 1800 may return to opening loop block 1810 to iterate over the next Parse Result 325 set of each iPID 330 within the the-current set of Parse Result 325 records.

At block 1830, Data Ingestion Module 1800 may group iPID 330 records according to MPID 332. If an iPID 330 was not previously selected to be an MPID 332 for a group of iPID 330 records or for an individual iPID 330 record, then the sole iPID 330 may be assigned as an MPID 332 for its own group (itself).

At block 1835, Data Ingestion Module 1800 may obtain one or more categories associated with the MPID 332 of block 1835, such as according to a Category 335 record stored in Indix Datastore 300, as may have been assigned by, for example, Assigner Routine 1200 as described in U.S. patent application Ser. Nos. 14/726,707 and 13/951,244 in relation to MPID.

At block 1840, based on the geo of block 1820 and the Category 335 of block 1835, Data Ingestion Module 1800 may determine a Get Store Primary 185 and/or Get Store Replica-1 186 to -N 187 and a Search-Analytics Primary 175 and/or Search-Analytics Replica-1 176 to -N 177 already associated with the geo of block 1820 and the Category 335 of block 1835. This may be obtained from, for example, Shard Map 393. If not already set, Data Ingestion Module 1800 may set a Get Store Primary 185 and/or Get Store Replica-1 186 to -N 187 and a Search-Analytics Primary 175 and/or Search-Analytics Replica-1 176 to -N 177 to associate with the geo of block 1820 and the Category 335 of block 1835. This may be recorded in, for example, Shard Map 393. Thus, Get Store Primary 185 and Replicas thereof and Search-Analytics Primary 175 and Replicas thereof (and Shard(s) within both) may both be organized based on Category 335 and geo. Periodically, the Categories and geo within the Shards may be redistributed or rebalanced.

At block 1845, Data Ingestion Module 1800 may store G-S Records in the Get Store repositories identified in block 1840. For example, the following types of records may be stored in Get Store Primary 185 and/or Get Store Replica-1 186 to -N 187: granular, highly detailed, complete current Price Attribute 340 and Product Attribute 345 records, including iPID 330, URI 305, image-URIs, and the like. New or updated Price Attribute 340 records associated with an iPID 330 may be stored in the Get Store repositories identified in block 1840, while historic records previously in the Get Store repositories may be moved to, for example, History Repository 188 (each iPID 330 may be associated with a set of Price Attribute 340 records, a current record and historic records). With respect to Product Attribute 345 records, Data Ingestion Module 1800 may merge the most recent Product Attribute 345 record into a Product Attribute 345 record associated with each iPID 330 (each iPID 330 may be associated with one Product Attribute 340 record). In this merger, new values overwrite old values unless the old record is longer or unless the old record otherwise is judged to be of higher quality (such as if the old record uses fewer words, but the words are less common than the words in the new record); if a new record does not have a value where an old value exists, the old value may be left.

If not already performed, at block 2000, Data Ingestion Module 1800 may execute Get Store Index Module 2000, to index the records stored in Get Store Primary 185 and/or Get Store Replica-1 186 to -N 187.

At block 500, Data Ingestion Module 1800 performs Core Price Module 500 (described further herein), utilizing the updated records in Get Store repositories.

At block 600, Data Ingestion Module 1800 performs the Insight Module 600 utilizing and expanding upon the output of the Core Price Module 500. Generally, Insight Module 600 identifies what Product Attributes 345 and Price Attributes 340 across the datasets are associated with the changes in price.

At block 1850, Data Ingestion Module 1800 stores the output of Core Price Module 500 and of Insight Module 600 in the Indix Database 300 as Insight 375 in the S-A repositories identified in block 1840. For example, the following types of records may be stored in Search-Analytics Primary 175 and/or Search-Analytics Replica-1 176 to -N 177: Product Title 395 tokens, the output of Core Price Module 500 (such as Core Price 380 records), the output of Insight Module 600 (Insight 375 records), MPID 332 and iPID 330 record values (which may be used to find corresponding records in Get Store Primary 185 and/or Get Store Replica-1 186 to -N 187), and other records which are not granular or detailed in nature, but are the result of processing granular records (such as Price Attribute 340 and Product Attribute 345 records). Historic records, such as historic Core Price 380 and Insight 375 records may be moved to History Primary 188 and/or History Replica-1 189.

If not already performed, at block 2100, Data Ingestion Module 1800 may execute Search and Analytics Index Module 2100, to index the records stored in Search-Analytics Primary 175 and/or Search-Analytics Replica-1 176 to -N 177.

At block 1855, Shard Map 393 may be updated, for example, to reflect changes to the Primary/Shard structure. For example, as records are stored in and moved between data stores, existing Shards may be combined and/or new Shards may be created to accommodate changes in the number of records associated with Category 335 and geo. Other changes in the Primary and Shard structure may also be implemented, which may require updates to Shard Map 393.

At closing loop block 1860, Data Ingestion Module 1800 may return to opening loop block 1805 to iterate over the next set of Parse Result 325 records, if any.

At concluding block 1899, Data Ingestion Module 1800 conclude and/or return to a process which may have spawned it.

Figure 19:
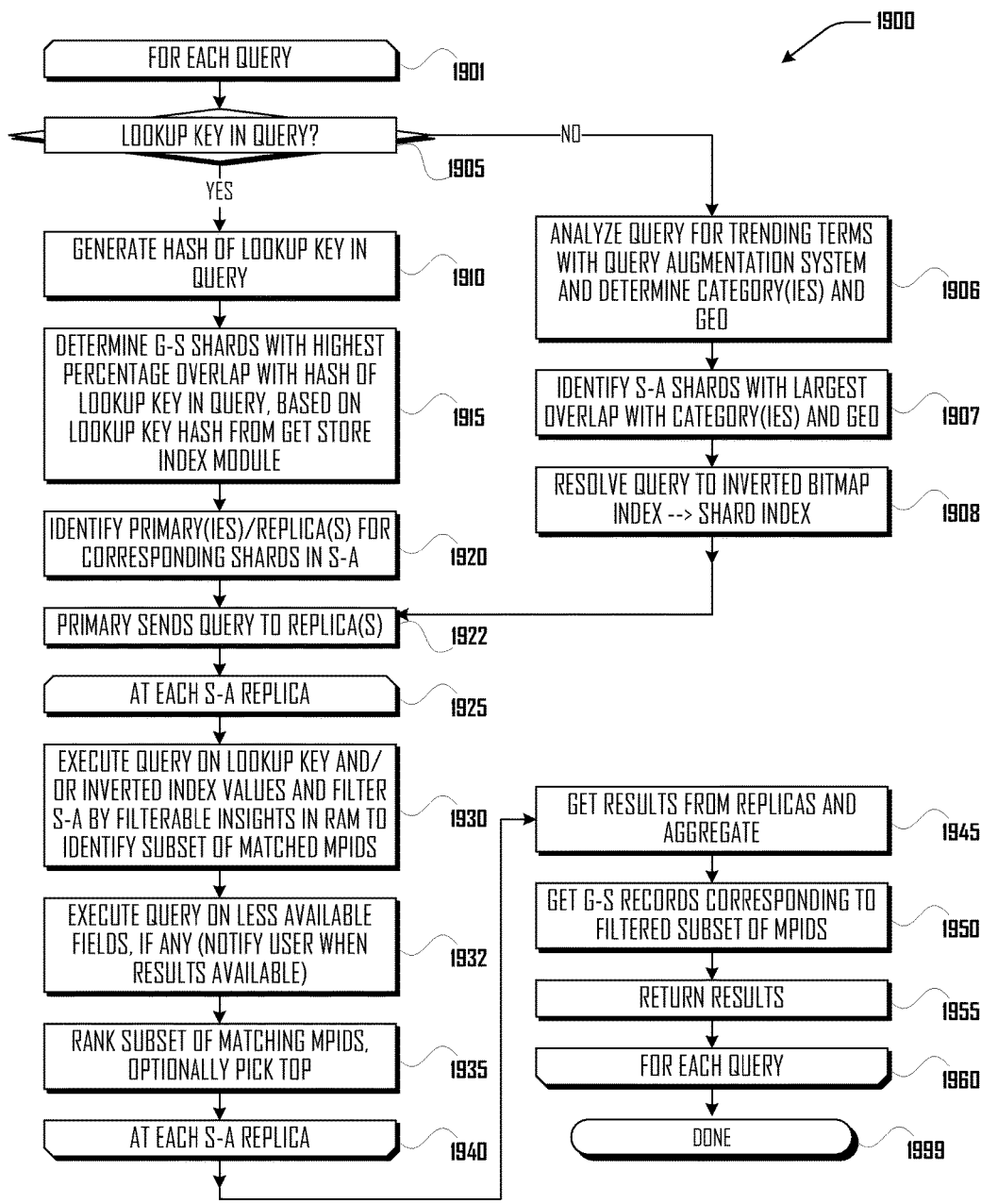
FIG. 19 is a flowchart illustrating an embodiment of a Query Module.

FIG. 19 is a flowchart illustrating an embodiment of Query Module 1900. Query Module 1900 may be executed with respect to user queries. A user query may comprise a "free text" search, which may be converted to a Boolean text search with an inferred relationship with specific records in Indix Datastore 300. A user query may also be constructed by entering values into structured search fields, which search fields are tied to specific records in Indix Datastore 300. Certain of the records in the Indix Datastore 300 are highly structured, with many hierarchical relationships. For example, a group of iPIDs 330 for a common Product will have a common MPID 332. An MPID 332 can be used to identify the iPIDs 330 in the MPID 332. Merchants have Stores. These and many other hierarchical relationships exist among the data records in the Indix Datastore 300. In addition, many of the records in the Indix Datastore 300 have high cardinality. Cardinality generally describes the number of unique elements in a set. A set comprising a large number of different or unique elements has high cardinality. An example of a high cardinality record set is one comprising UPCs, SKUs, MPNs, or URIs (iPID 330 may be derived from a URI, this may be reversible). Many traditional search engines have a very flat data model, without hierarchical relationships; many traditional search engines do not work well with record sets with high cardinality. Query Module 1900 must be able to rapidly and efficiently search records which have hierarchical relationships and with respect to queries which may or may not be addressed to record sets which have high cardinality. Modules which feed data into these record sets (such as Get Store Index Module 2000, Core Price Module 500, Insight Module 600, and Search and Analytics Module 2100) must be able to operate very rapidly, so as to allow a user to input websites to be crawled, have them crawled, and have Parse Results 325 and data therefrom be available within seconds.

Opening loop block 1901 to closing loop block 1960 may iterate for each user query.

At block 1905, Query Module 1900 may identify a high cardinality Lookup Key in the user query, such as if the user query contains a field which is identifiable as or is identified as a UPC, SKU, MPN, or a URI. The presence of a Lookup Key is not required, but, if present, should be addressed to shorten the search process.

At block 1910, Query Module 1900 may generate a hash of the Lookup Key in the query. At block 1915, Query Module 1900 may compare the hash of block 1910 with Lookup Key Hash 385 records (previously generated during execution of Get Store Index Module 2000) and determine, via this comparison, which G-S Shard has the highest percentage overlap with the Lookup Key in the user query.

At block 1920, Query Module 1900 may identify the Primary and/or Replica(s) associated with the G-S Shard(s) identified in block 1915. Because the G-S Shards and S-A Shards may both be organized by Category 335 and geo, (though the memory in each contains different types of records), they have a similar indexing structure, so identification of which G-S Shard has the highest percentage overlap with the Lookup Key in the user query may also be used to identify which S-A Shard(s) are likely to be responsive to the user query.

At block 1906, Query Module 1900, such as utilizing Query Augmentation Handler 171 and Query Augmentation Module 260, may weight components of the query for trending terms in popular culture and may determine one or more Category 335 for the query. For example, the term "apple" may refer to a computer, a line of fashionable clothes, or to a type of fruit. Query Augmentation Module 260 may detect that the "apple" clothing line is trending on other search engines, in social media, and the like and may associate the query with a "clothing" Category 335. Block 1906 may further identify a geographic area or "geo" associated with the query. This may be based on a location provided by, for example, the user in the query ("red Nike shoes in Seattle") or in account or other information provided by the user, or it may be obtained from an IP address or other location information obtained in conjunction with the query.

At block 1907, Query Module 1900 may identify the S-A Shard(s) which have an overlap with or which overlap the most with the Category 335 and geo identified in block 1906 (the Shard(s) being organized by Category and geo by Data Ingestion Module 1800).

At block 1908, Query Module 1900 may further resolve the query to S-A Shard(s), such as within group of S-A Shard(s) identified in block 1907, according to Inverted Bitmap Index 394. Inverted Bitmap Index 394 may have been created by, for example, Search and Analytics Index Module 2100, which may be a subroutine of Data Ingestion Module 1800. Inverted Bitmap Index 394 may comprise, for example, an inverted bitmap index of significant terms such as Brand, Category, Store, geography and Product Title 395 components, which terms may be of low cardinality. Resolving the query to S-A Shard(s) according to Inverted Bitmap Index 394 may return a list of S-A Shards, ranked according to highest correlation with the query.

At block 1922, the Primary(ies) for the S-A Shards of block 1920 and 1908 may send the query to the identified Replicas, to be executed relative to the identified Shards.

Opening loop block 1925 to closing loop block 1940 may iterate for each S-A Replica identified in block 1920 and block 1922. If no Replica was identified, then the search may take place at the Primary.

At block 1930, the Replica may execute the query using the Lookup Key of block 1905 (or a hash thereof) and the Inverted Bitmap Index 394 values of block 1908. In addition, if the query contains or refers to an Insight 375 record, which Insight 375 was stored in RAM for rapid search by Search and Analytics Index Module 2100, Query Module 1900 may also filter the S-A Shard(s) according to such filterable Insight 375 record components.

The result will be a subset of MPID 332 records in the S-A Primary and/or Replica(s), which subset of MPID 332 records will refer to iPID 330 records.

For example, a search of a SKU number of a shoe may, at block 1915, identify a set of G-S Shards containing the SKU and, at block 1920, a set of corresponding S-A Shards. The query may additionally or alternatively contain a Store which may be used at block 1908 in the Inverted Bitmap Index 394 to resolve the query to S-A Shards. The query may also request Substitutes for the SKU number at the Store, which may be a filterable value in an Insight 375 record which may be stored in RAM in the S-A Shard. The Lookup Key, Inverted Bitmap Index values, and/or filterable Insight 375 record values may be used at block 1930 to further refine the set of MPID 332 results.

At optional block 1932, queries addressed to fields in Indix Datastore 300 which are not available for real time searching, such as queries addressed to fields not stored in RAM, may be executed at a slower rate. In such cases, a notification may be sent to the user when the results are available to be viewed.

The result may be a set of MPID 332 records in the filtered S-A Shards, which MPID 332 records link to iPID 330 records in the G-S Shards.

Closing loop block 1940 may return to opening loop block 1925 to iterate over the next S-A Replica identified in block 1920 and block 1922.

At block 1945, the results from more than one Replica (if used) may be collected and aggregated.

At block 1950, Query Module 1900 may get G-S Shard records corresponding to the ranked MPID 332 results of blocks, such as according to the subset of iPID 330 records of block 1930 and/or 1935. The iPID 330 records may be used to allow the user to see search results specific to a specific iPID 330 and URI 305, including a specific product image, webpage snapshot, Product Attributes 345 and Price Attributes 340 obtained in Parse Results 325 from the webpage.

At block 1955, Query Module 1900 may return the results to the user and/or to a software application which is servicing the user, such as User Contact Module 1700.

At closing loop block 1960, Query Module 1900 may return to opening loop block 1901 to iterate over the next user query, if any.

At concluding block 1999, Query Module may conclude or may return to a process which spawned it.

Figure 20:
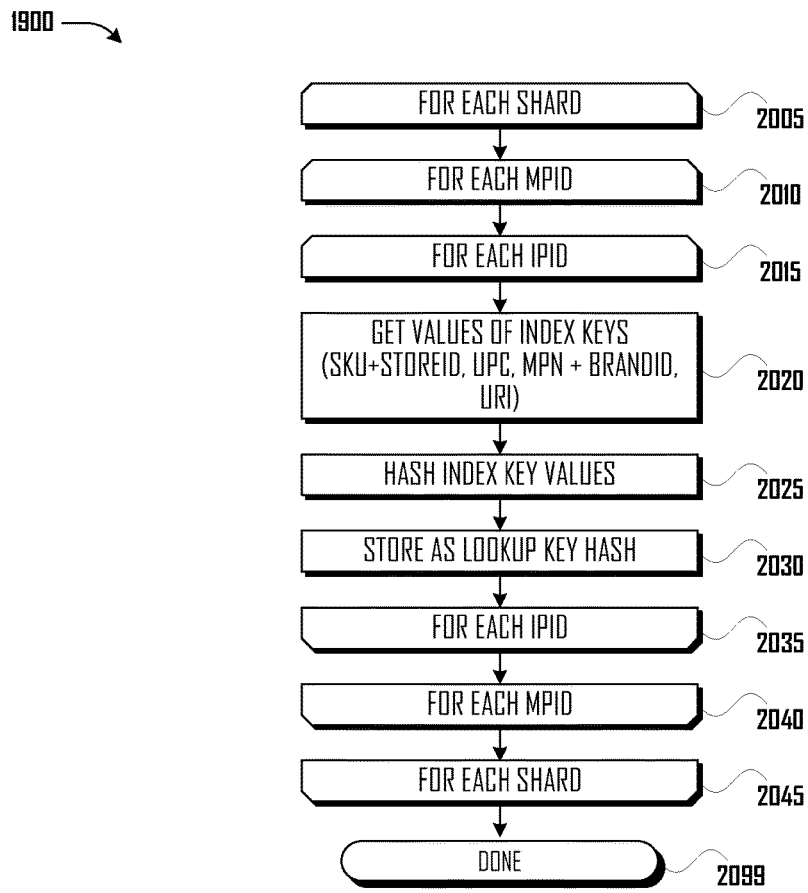
FIG. 20 is a flowchart illustrating an embodiment of a Get Store Index Module.

FIG. 20 is a flowchart illustrating an embodiment of Get Store Index Module 2000. Get Store Index Module 2000 may be executed to index records stored in Get Store Primary 185, Replica's thereof, and Shards thereof, such as G-S Share 1 140 to G-S Shard N 143 (which may be referred to as "G-S Shard").

Opening loop block 2005 to closing loop block 2045 may iterate for each G-S Shard into which a record is to be stored. Opening loop block 2010 to closing loop block 2040 may iterate for each MPID 332 in each record which is to be stored. Opening loop block 2015 to closing loop block 2035 may iterate for each iPID 330 in each MPID 332 in each record which is to be stored.

At block 2020, Get Store Index Module 2000 may get the values of index keys in the record. The index keys may be high cardinality, frequently searched terms and/or combinations of terms. Examples of such index keys include SKU plus store identifier, UPC number, MPN plus Brand identifier, and URI (from which iPID 330 may be reversibly derived—in other words, it may be possible to determine iPID 330 from a URI).

At block 2025, Get Store Index Module 2000 may individually hash the index key values. The hash process may be lossless. At block 2030, the hashed index key values may be stored as Lookup Key Hash 385 records. Indexing of these records in this manner allows rapid identification and retrieval of corresponding records, as the corresponding webpages are crawled, providing essentially "live" search results, notwithstanding the very large number of webpages for which data is obtained. Index records may generally be stored or grouped as Index 370 records.

At block 2035, Get Store Index Module 2000 may return to block 2015 to iterate over the next iPID 330 in each MPID 332 in each record which is to be stored. At block 2040, Get Store Index Module 2000 may return to block 2010 to iterate over the next MPID 332 in each record which is to be stored. At block 2045, Get Store Index Module 2000 may return to block 2005 to iterate over the next G-S Share into which each record is to be stored.

At concluding block 2099, Get Store Index Module 2000 may conclude or return to a process which may have spawned it.

Figure 21:
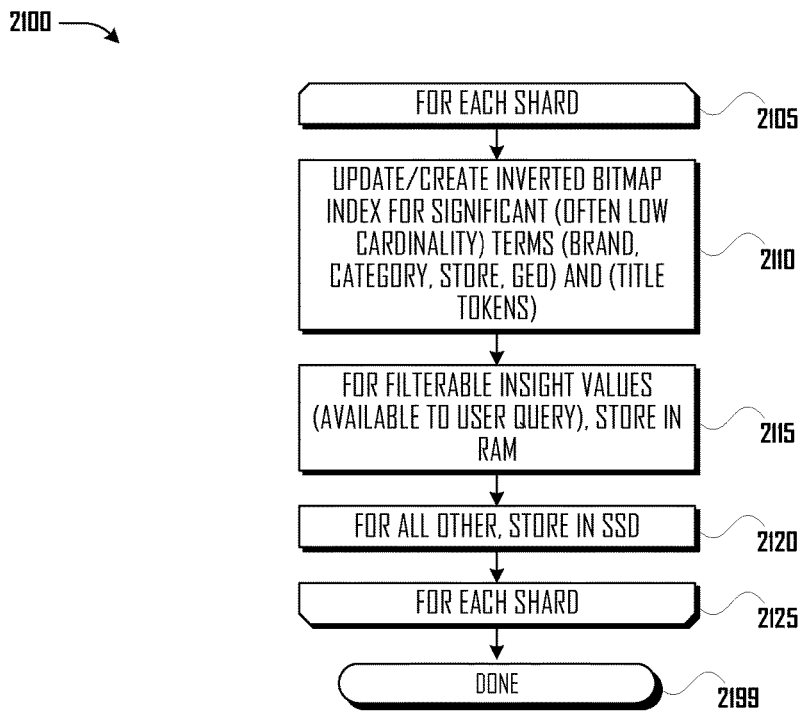
FIG. 21 is a flowchart illustrating an embodiment of a Search and Analytics Index Module.

FIG. 21 is a flowchart illustrating an embodiment of Search and Analytics Index Module 2100. Search and Analytics Index Module 2100 indexes records stored in Search-Analytics Primary 175 and/or Search-Analytics Replica-1 176 to -N 177, allowing for rapid search and identification of such records.

Opening loop block 2105 to closing loop block 2125 may iterate for each record stored in each S-A Shard 1 136 to S-A Shard N 137 ("S-A Shard"), such as during execution of Data Ingestion Module 1800.

At block 2110, Search and Analytics Index Module 2100 may update and/or create an inverted bitmap index for low cardinality terms which are nonetheless significant and/or which are used frequently in queries. Examples include Brand, Category (which may be a Category 335 record), Store, and geographic identifier (such as an address, region, city, state, or other geographic area or identifier). At block 2110, Search and Analytics Index Module 2100 may also include in the inverted bitmap index an index of the value of tokens in a Product Title for the record. As used herein, a Product Title 395 record may be obtained from a Parse Result 325 from a URI 305, and is generally given or provided by a Merchant on a webpage. Product Title 395 records generally comprise a subset of Product Attributes 345, such as the Product Attribute 345 types which occur most commonly within a Category 335 and/or within an MPID 332. A. The inverted bitmap index may be stored as Inverted Bitmap Index 394, which may be referenced by or grouped in Index 370.

At block 2115, those Insight 375 records which are available to be queried by users may be stored in RAM for the S-A Shard, such as in RAM 251, while other records may be stored in SSD, such as in SSD 253. Insight 375 records include the output of Volatility Module 700, Substitution Module 800, Mix Module 900, Prediction Module 1000, Competition Module 1100, Promotion Module 1200, Leadership Module 1300, Premium Module 1400, Price Range Module 1500, and Reach Module 1600. The output of such modules may be available to be searched by users; a subset of this output may be available for rapid searching and may be stored in RAM 251 for the S-A Shard.

At closing loop block 2125, Search and Analytics Index Module 2100 may return to opening loop block 2105 to iterate over the next record stored in each S-A Shard.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform modules having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

The invention claimed is:

1. A computer implemented method of storing information and searching the stored information in close-to real-time, the method comprising:

at a first computer comprising a processor and a memory, which memory comprises:
an attribute datastore for storing price and product attributes for a set of products, which price and product attributes are obtained from webpages accessed via Uniform Resource Identifiers ("URIs"),
a history datastore for storing historical price and product attributes for the set of products, and
an analytics datastore for storing the result of an analysis of the price and product attributes in the attribute datastore and the history datastore;

at the first computer receiving a set of price and product attributes obtained from a web site for a first product, which attributes comprise a first category in a category taxonomy;

at the first computer determining a geographic area of the website;

at the first computer determining a replica of the attribute datastore and a replica of the analytics datastore, based on the geographic area of the website and the first category;

by the first computer storing the price and product attributes in the determined replica of the attribute datastore;

performing the analysis and storing the result of the analysis in the determined replica of the analytics datastore;

with respect to the price and product attributes stored in the determined replica of the attribute datastore, obtaining a set of values of high cardinality entries in the price and product attributes and hashing each such value to form a set of index key hash values;

forming an inverted bitmap index of a subset of the result of the analysis of the price and product attributes stored in the determined replica of the analytics datastore;

receiving a query from a client device coupled to the first computer over a network;

hashing a high cardinality search term in the query, if any, and comparing the hashed high cardinality search term with the set of index key hash values to determine that the replica of the attribute datastore comprises a set of records responsive to the query or, if the query does not comprise a high cardinality search term, searching for terms in the query according to the inverted bitmap index to identify the corresponding replica in the analytics datastore and the set of records responsive to the query therein;

in response to the query, returning the set of records responsive to the query to the client device, for display to a user via a user interface on the client device.

2. The method according to claim 1, wherein the price and product attributes further comprise:
   a first identifier of a first identifier-type derived from a URI which links to a webpage offering the product for sale, and
   a second identifier of a second identifier-type assigned to all instances of the product as offered for sale at any URI;
   and wherein the analysis comprises:
   performing a first URI-specific price analysis of price values in the first and second sets of price and product attributes to identify changes in price for the first product and associating the result with the first identifier of the first identifier-type and saving the result as a first URI-specific core price result;
   receiving a third and fourth set of price and product attributes for a second product, which attributes comprise:
     a third identifier of the first identifier-type,
     a fourth identifier of the second identifier-type, and
     a second category in the category taxonomy;
   performing a second URI-specific price analysis of price values in the third and fourth sets of price and product attributes to identify changes in price for the second product and associating the result with the third identifier of the first identifier-type and saving the result as a second URI-specific core price result;
   when the second identifier and the fourth identifiers are the same, performing a first non-URI-specific price analysis utilizing the first and second URI-specific core price results to identify changes in price according to the second identifier-type and saving the result as a first non-URI-specific core price result;
   saving and indexing the output of the URI-specific and non-URI-specific price analyses in the analytics datastore;
   performing a meta-analysis utilizing the URI-specific and non-URI-specific core price results to identify what product and price attributes across the datasets are associated with the changes in price; and
   saving the output of the meta-analysis in the analytics datastore.

3. The method of claim 2, wherein the URI-specific price analysis comprises determining the high, low, average, mean, magnitude and number of price changes over at least one time period for the price and product attributes associated with the same identifier of the first identifier-type.

4. The method of claim 2, wherein the non-URI-specific price analysis comprises determining the high, low, average, mean, magnitude and number of price changes over at least one time period for the price and product attributes associated the same identifier of the second identifier-type.

5. The method of claim 4, wherein at least one of the first and second identifier-types are further associated with at least one of a store, a merchant, and a location and wherein the non-URI-specific price analysis produces results associated therewith.

6. The method of claim 2, wherein the price attributes comprise at least one of a time, a product name, a price, a quantity, a unit of measurement, a merchant name, a store name, a bundle detail, and a location.

7. The method of claim 2, wherein the product attributes comprise at least one of a title, a brand, a category in the category taxonomy, a color, a product type, and a size.

8. The method of claim 2, further comprising receiving a user query and executing the query relative to the analytics datastore.

9. The method of claim 2, further comprising receiving a user query, a schedule for executing the query, executing the query at the scheduled time on the analytics datastore, and alerting the user regarding the result of the query.

10. The method of claim 2, wherein the first and second file structures may be searched by at least one of the first identifier-type, the second identifier-types, or a category in the category taxonomy.

11. The method of claim 2, wherein the first and second categories are the same.

12. The method of claim 2, wherein the meta-analysis determines the volatility of price changes over time for each of the first and second products.

13. The method of claim 12, wherein the volatility is determined by counting the number of price changes in a time period according to at least one of the first identifier-type, the second identifier-type, a brand, a region, a price band, and a category in the category taxonomy.

14. The method of claim 2, wherein the meta-analysis determines whether one of the products is a substitute for the other.

15. The method of claim 14, wherein whether one of the products is a substitute for the other is determined by determining if the first and second products are in the same category in the category taxonomy and by determining whether the first and second products are within a price band within the category.

16. The method of claim 15, further comprising determining if the first and second products share at least fifty-percent of the same product attributes.

17. The method of claim 2, wherein the meta-analysis determines predictions regarding the future prices for the products.

18. The method of claim 17, wherein the predictions are determined by obtaining the last price of at least one of the products from the URI-specific core price associated therewith, calculating or obtaining first and second linear regression parameters, multiplying the second linear regression parameter by the last price and adding this to the first linear regression parameter.

19. The method of claim 2, wherein the price and product attributes comprise at least one of a store, merchant, or brand and the meta-analysis determines products associated therewith and competitors thereof.

20. The method of claim 2, wherein the meta-analysis determines whether a price change for the first product leads or follows a price change for the second product.

21. The method of claim 2, wherein the meta-analysis determines whether the first or second product is a premium product relative to the other.

22. The method of claim 2, wherein the meta-analysis determines the price ranges in which the products are offered for sale.

23. An apparatus for storing information and searching the stored information in close-to realtime, the apparatus comprising:
   a computer processor and memory, which memory comprises:
     an attribute datastore for storing price and product attributes for a set of products, which price and product attributes are obtained from webpages accessed via Uniform Resource Identifiers ("URIs"),
     a history datastore for storing historical price and product attributes for the set of products, and an analytics datastore for storing the result of an analysis of the price and product attributes in the attribute datastore and the history datastore;
a data ingestion module;
an attribute datastore index module;
an analytics datastore index module;
a core price module and an insight module;
a user contact module; wherein the data ingestion module is to:
receive a set of price and product attributes obtained from a web site for a first product, which attributes comprise a first category in a category taxonomy;
determine a geographic area of the website;
determine a replica of the attribute datastore and a replica of the analytics datastore, based on the geographic area of the website and the first category;
store the price and product attributes in the determined replica of the attribute datastore;
store the result of an analysis of the price and product attributes in the determined replica of the attribute datastore and the history datastore;

wherein the attribute datastore index module is to, with respect to the price and product attributes stored in the determined replica of the attribute datastore, obtain a set of values of high cardinality entries in the price and product attributes and hash each such value to form a set of index key hash values;

wherein the core price module and an insight module are to perform the analysis of the price and product attributes in the attribute datastore and the history datastore;

wherein the analytics datastore index module is to form an inverted bitmap index of a subset of the result of the analysis of the price and product attributes stored in the determined replica of the analytics datastore;

wherein the user contact module is to:
receive a query from a user device, the user device coupled to the apparatus over a network, hash a high cardinality search term in the query, if any, and compare the hashed high cardinality search term with the set of index key hash values to determine that the replica of the attribute datastore comprises a set of records responsive to the query or, if the query does not comprise a high cardinality search term, search for terms in the query according to the inverted bitmap index to identify the corresponding replica in the analytics datastore and the set of records responsive to the query therein, and
return the set of records responsive to the query to the user device, for display to a user via a user interface on the user device.

* * * * *